United States Patent
Subbaramoo et al.

(10) Patent No.: US 10,187,759 B2
(45) Date of Patent: Jan. 22, 2019

(54) SYSTEMS AND METHODS FOR GROUP COMMUNICATION USING A MOBILE DEVICE WITH MODE DEPENDING ON USER PROXIMITY OR DEVICE POSITION

(71) Applicant: QUALCOMM Incorporated, San Diego, CA (US)

(72) Inventors: Shobha Subbaramoo, San Diego, CA (US); Mark Aaron Lindner, Superior, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/694,059

(22) Filed: Apr. 23, 2015

(65) Prior Publication Data
US 2015/0230066 A1    Aug. 13, 2015

Related U.S. Application Data

(62) Division of application No. 13/479,251, filed on May 23, 2012.

(51) Int. Cl.
*H04W 4/10*           (2009.01)
*H04W 8/22*           (2009.01)
(Continued)

(52) U.S. Cl.
CPC ............ *H04W 4/10* (2013.01); *G06F 1/1626* (2013.01); *G06F 1/3231* (2013.01);
(Continued)

(58) Field of Classification Search
CPC ............. H04M 2250/12; H04M 1/605; H04M 1/72552; H04M 1/72563; H04W 4/08;
(Continued)

(56) References Cited

U.S. PATENT DOCUMENTS

| | | | |
|---|---|---|---|
| 5,657,372 A | * | 8/1997 | Ahlberg ............ H04M 1/72513 455/414.1 |
| 6,115,025 A | | 9/2000 | Buxton et al. |

(Continued)

FOREIGN PATENT DOCUMENTS

| | | |
|---|---|---|
| CN | 1287458 A | 3/2001 |
| CN | 1656366 A | 8/2005 |

(Continued)

OTHER PUBLICATIONS

International Preliminary Report on Patentability—PCT/US2013/041770, The International Bureau of WIPO—Geneva, Switerland, dated Oct. 10, 2014.

(Continued)

*Primary Examiner* — Jaime Holliday
(74) *Attorney, Agent, or Firm* — Jae-Hee Choi; The Marbury Law Group

(57) ABSTRACT

Methods and systems for controlling group communications using a mobile device includes detecting a motion of the mobile device corresponding to a user placing the device on a surface, maintain a communication session with another mobile device while the user is detected in proximity to the first mobile device, and entering a non-active communication mode when the user is not detected in proximity to the device. The communication session may be maintained for a time-out period before entering the non-active mode. Further methods and systems include transitioning to a non-active communication mode in response to detecting a motion of the mobile device corresponding to a user placing the device on a surface.

4 Claims, 22 Drawing Sheets

(51) Int. Cl.
*H04W 4/08* (2009.01)
*H04M 1/60* (2006.01)
*H04M 1/66* (2006.01)
*G06F 1/16* (2006.01)
*G06F 1/32* (2006.01)
*H04W 4/16* (2009.01)
*H04W 76/45* (2018.01)
*H04W 52/02* (2009.01)
*H04M 1/725* (2006.01)

(52) U.S. Cl.
CPC .......... *G06F 1/3246* (2013.01); *H04M 1/605* (2013.01); *H04M 1/66* (2013.01); *H04W 4/08* (2013.01); *H04W 4/16* (2013.01); *H04W 8/22* (2013.01); *H04W 76/45* (2018.02); *G06F 2200/1637* (2013.01); *H04M 1/72552* (2013.01); *H04M 1/72563* (2013.01); *H04M 2250/12* (2013.01); *H04W 52/027* (2013.01); *H04W 52/0254* (2013.01); *H04W 52/0258* (2013.01); *Y02D 10/173* (2018.01)

(58) Field of Classification Search
CPC ........... H04W 52/027; H04W 52/0254; H04W 52/0258
USPC ...................... 455/418, 567, 550.1
See application file for complete search history.

(56) References Cited

U.S. PATENT DOCUMENTS

| | | | |
|---|---|---|---|
| 6,327,471 B1 | 12/2001 | Song | |
| 6,411,828 B1 | 6/2002 | Lands et al. | |
| 6,449,363 B1 | 9/2002 | Kielsnia | |
| 6,498,600 B1 | 12/2002 | Vance et al. | |
| 6,704,581 B1 | 3/2004 | Park et al. | |
| 6,795,544 B1 | 9/2004 | D'Arcy et al. | |
| 8,014,733 B1 | 9/2011 | Gailloux et al. | |
| 8,185,144 B1 | 5/2012 | Wick et al. | |
| 8,238,900 B2 | 8/2012 | Emrich et al. | |
| 8,306,203 B1* | 11/2012 | Szuszczewicz | H04W 76/38 379/201.01 |
| 8,406,390 B1* | 3/2013 | Halferty | H04M 3/42221 379/202.01 |
| 8,681,664 B2 | 3/2014 | Razdan et al. | |
| 8,878,889 B1 | 11/2014 | Kaupp et al. | |
| 2002/0172169 A1 | 11/2002 | Rosen et al. | |
| 2003/0058827 A1 | 3/2003 | Chow et al. | |
| 2003/0193930 A1 | 10/2003 | Wotherspoon et al. | |
| 2005/0097189 A1 | 5/2005 | Kashi | |
| 2005/0184875 A1 | 8/2005 | Schmandt et al. | |
| 2005/0212749 A1* | 9/2005 | Marvit | G06F 1/1613 345/156 |
| 2005/0245203 A1 | 11/2005 | Vance et al. | |
| 2006/0019613 A1 | 1/2006 | Lim | |
| 2006/0056320 A1 | 3/2006 | Gatts | |
| 2006/0123224 A1 | 6/2006 | Klug et al. | |
| 2006/0142037 A1 | 6/2006 | Sung et al. | |
| 2006/0178159 A1 | 8/2006 | Timms et al. | |
| 2007/0036348 A1 | 2/2007 | Orr | |
| 2007/0123202 A1 | 5/2007 | Cho, II et al. | |
| 2007/0202929 A1 | 8/2007 | Satake | |
| 2007/0225049 A1 | 9/2007 | Andrada | |
| 2007/0239885 A1 | 10/2007 | Vadlakonda et al. | |
| 2007/0263603 A1* | 11/2007 | Schmitt | H04L 12/1831 370/356 |
| 2007/0287491 A1 | 12/2007 | Cradick et al. | |
| 2007/0298751 A1 | 12/2007 | Wulff | |
| 2008/0158000 A1* | 7/2008 | Mattrazzo | H04M 1/05 340/4.4 |
| 2009/0060170 A1 | 3/2009 | Coughlan et al. | |
| 2009/0099812 A1* | 4/2009 | Kahn et al. | 702/152 |
| 2009/0129297 A1 | 5/2009 | Tamura | |
| 2009/0170480 A1 | 7/2009 | Lee | |
| 2009/0182560 A1 | 7/2009 | White | |
| 2009/0296904 A1 | 12/2009 | Brewer et al. | |
| 2010/0080084 A1 | 4/2010 | Chen et al. | |
| 2010/0120466 A1 | 5/2010 | Li | |
| 2010/0159998 A1* | 6/2010 | Luke | H04M 1/6041 455/567 |
| 2010/0167715 A1 | 7/2010 | Domene et al. | |
| 2010/0197335 A1 | 8/2010 | Jin et al. | |
| 2010/0290374 A1 | 11/2010 | Chin et al. | |
| 2011/0026698 A1 | 2/2011 | Kuhlke et al. | |
| 2011/0081899 A1 | 4/2011 | Stahulak et al. | |
| 2011/0086626 A1 | 4/2011 | Kerr | |
| 2011/0177846 A1 | 7/2011 | Sauerwein, Jr. et al. | |
| 2011/0228950 A1 | 9/2011 | Abrahamsson et al. | |
| 2011/0237293 A1 | 9/2011 | Komine | |
| 2011/0263241 A1 | 10/2011 | Duarte et al. | |
| 2011/0319128 A1 | 12/2011 | Miwa | |
| 2012/0008757 A1 | 1/2012 | Fried et al. | |
| 2012/0322404 A1 | 12/2012 | Stahulak et al. | |
| 2013/0051543 A1* | 2/2013 | McDysan et al. | 379/202.01 |
| 2013/0100017 A1* | 4/2013 | Papakipos et al. | 345/158 |
| 2013/0260834 A1 | 10/2013 | Ingalls | |
| 2013/0267181 A1 | 10/2013 | Ayatollahi et al. | |
| 2013/0315107 A1 | 11/2013 | Lindner et al. | |
| 2013/0315108 A1 | 11/2013 | Lindner et al. | |
| 2013/0315110 A1 | 11/2013 | Razdan et al. | |
| 2013/0316686 A1 | 11/2013 | Subbaramoo et al. | |
| 2013/0316687 A1 | 11/2013 | Subbaramoo et al. | |
| 2016/0037310 A1 | 2/2016 | Lindner et al. | |
| 2016/0156685 A1 | 6/2016 | Lindner et al. | |
| 2017/0265064 A1 | 9/2017 | Subbaramoo et al. | |

FOREIGN PATENT DOCUMENTS

| | | |
|---|---|---|
| CN | 1689354 A | 10/2005 |
| CN | 1725881 A | 1/2006 |
| CN | 1972489 A | 5/2007 |
| CN | 101035322 A | 9/2007 |
| CN | 101411174 A | 4/2009 |
| CN | 101496391 A | 7/2009 |
| CN | 101938558 A | 1/2011 |
| CN | 102340599 A | 2/2012 |
| CN | 102801869 A | 11/2012 |
| EP | 1662833 A1 | 5/2006 |
| EP | 1684493 A2 | 7/2006 |
| EP | 1770969 A1 | 4/2007 |
| EP | 2418803 A2 | 2/2012 |
| GB | 2415864 A | 1/2006 |
| JP | 2006352803 A | 12/2006 |
| JP | 2008219245 A | 9/2008 |
| JP | 2010051027 A | 3/2010 |
| JP | 2010258644 A | 11/2010 |
| KR | 20120107279 A | 10/2012 |
| WO | 04105414 | 12/2004 |
| WO | 2005043944 A1 | 5/2005 |
| WO | 2005104581 A1 | 11/2005 |
| WO | 2006105275 A2 | 10/2006 |
| WO | 2006117438 A1 | 11/2006 |
| WO | 2007149731 A1 | 12/2007 |
| WO | 2009049302 A1 | 4/2009 |
| WO | 2009151947 A1 | 12/2009 |
| WO | 2010019546 A2 | 2/2010 |
| WO | 2010054373 A2 | 5/2010 |
| WO | 2010074910 A2 | 7/2010 |

OTHER PUBLICATIONS

International Preliminary Report on Patentability—PCT/US2013/041775, The International Bureau of WIPO—Geneva, Switzerland, dated Sep. 25, 2014.
International Search Report and Written Opinion—PCT/US2013/041763—ISA/EPO—dated Nov. 8, 2013.
International Search Report and Written Opinion—PCT/US2013/041767—ISA/EPO—dated Aug. 29, 2013.
International Search Report and Written Opinion—PCT/US2013/041770, International Search Authority—European Patent Office, dated Dec. 4, 2013.

(56) References Cited

OTHER PUBLICATIONS

International Search Report and Written Opinion—PCT/US2013/041775—ISA/EPO—dated Dec. 17, 2013.
Partial International Search Report—PCT/US2013/041763—ISA/EPO—dated Aug. 29, 2013.
Partial International Search Report—PCT/US2013/041770—ISA/EPO—dated Aug. 29, 2013.

* cited by examiner

SYSTEMS AND METHODS FOR GROUP COMMUNICATION USING A MOBILE DEVICE WITH MODE DEPENDING ON USER PROXIMITY OR DEVICE POSITION

RELATED APPLICATIONS

This application is a divisional application of U.S. patent application Ser. No. 13/479,251, filed on May 23, 2012, the entire contents of which are incorporated herein by reference. This application is also related to U.S. patent application Ser. No. 13/479,246, entitled "Systems and Methods for Group Communication Using a Mobile Device With Mode Transition Based On Motion" filed on May 23, 2012; U.S. patent application Ser. No. 13/479,255 entitled "Systems and Methods for Establishing A Group Communication Based on Motion of a Mobile Device" filed on May 23, 2012; and U.S. patent application Ser. No. 13/479,258 entitled "Systems and Methods for Group Communication Using a Mobile Device Using Motion and Voice Activated Controls" filed on May 23, 2012, all of which are incorporated herein by reference for the subject matter disclosed in their respective claims.

BACKGROUND

For group communications between mobile devices, there exist a number of group communication applications, such as "Push-to-Talk" (PTT) applications, which utilize half-duplex communication between two or more mobile devices. These applications may be utilized on various types of mobile devices, such as smartphones, which may employ a touchscreen interface. In such devices which may have few or no hardware buttons, users must tap or touch the display instead of pressing a traditional hardware PTT button to request/relinquish control of the "floor" in a half-duplex group communication session. This need to touch the display screen can sometimes be problematic in the context of a touchscreen-based device, as it can be difficult to hold and maneuver the device handset while simultaneously touching/manipulating the display screen. The most natural way to operate a handset during a group communication session is in speakerphone mode, which enables the user to hear incoming voice communications and view media content while also making it easier to navigate and manipulate the touchscreen interface as needed.

Of course, one drawback to using the mobile device in speakerphone mode is that it provides little privacy for the participants of the group communication. In order to speak in a more private manner, such as when the user enters a crowded room or when the group conversation veers to sensitive subject matter, the user must take a particular action to switch the device from speakerphone mode to earpiece mode before bringing the handset to his/her ear. Similarly, when the user desires to switch back to speaker mode, the user must take another action to accomplish the switch from earpiece mode to speakerphone mode. Also, when one user in the group switches from speakerphone mode to earpiece mode, or vice versa, there is no way for the other users in the group to know this has occurred.

SUMMARY

The various embodiments include methods, systems and devices for conducting group communications using a first mobile device, including communicating with at least one second mobile device, detecting a motion of the device corresponding to a user placing the mobile device on a surface, maintaining the communication with the at least one second mobile device in an active mode while the user is detected in proximity to the device, and entering a non-active communication mode when the user is not detected in proximity to the device.

Further embodiments include methods, systems and devices for conducting group communications using a first mobile device, including communicating with at least one second mobile device, detecting a motion of the device corresponding to a user placing the mobile device face down on a surface, and entering a non-active communication mode in response to the detected motion.

Further embodiments include methods, systems and devices for conducting group communications using a first mobile device, including communicating with at least one second mobile device over a communication channel, detecting a motion of the first mobile device corresponding to a particular user action, and in response to the detected motion, entering a non-active communication mode of communication with the at least one second mobile device.

Various embodiments include mobile communication devices and servers including processors configured to perform operations of the embodiment methods disclosed herein. Various embodiments also include mobile communication devices and servers including means for performing functions of the embodiment methods disclosed herein. Various embodiments also include non-transitory processor- and server-readable storage media having stored thereon processor-executable instructions configured to cause a processor to perform operations of the embodiment methods disclosed herein.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
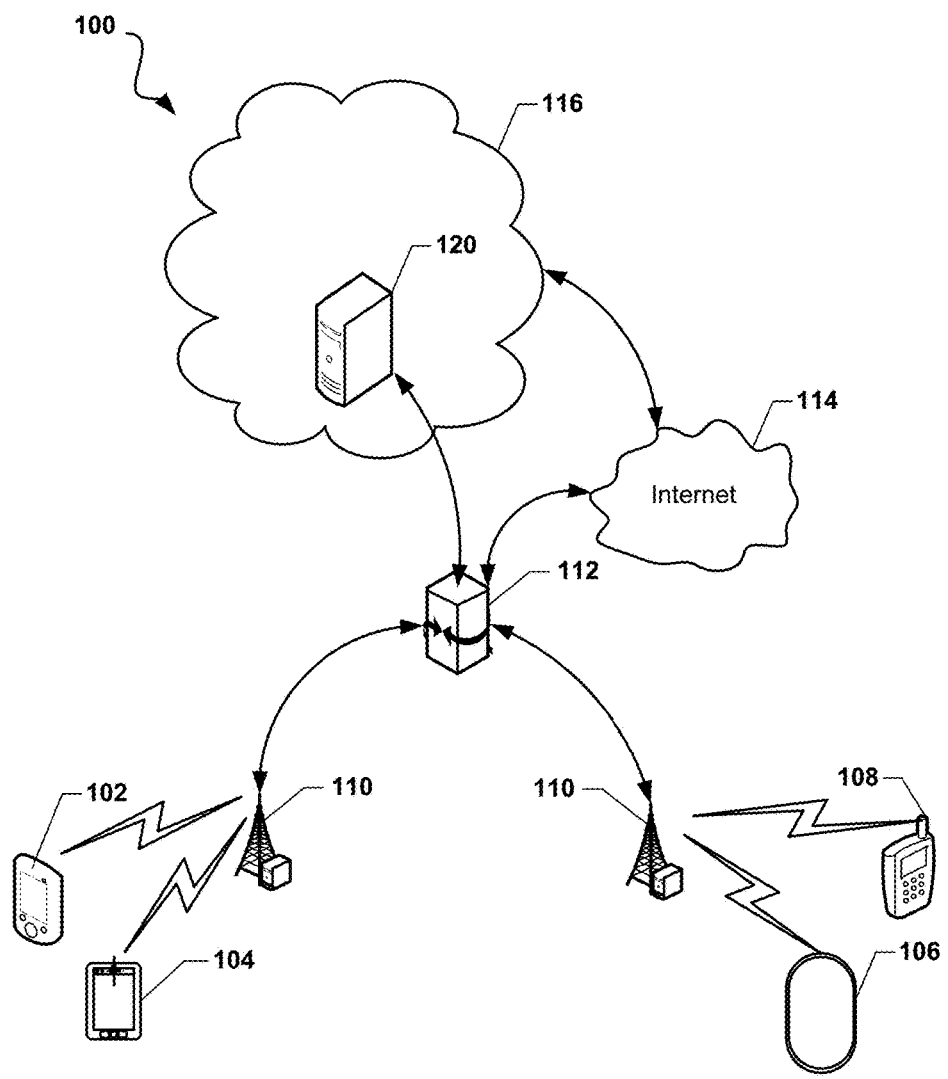
FIG. 1 is a system diagram of an example system for group communication between a plurality of mobile devices.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device," "mobile computing device," "mobile communication device" and "wireless communication device" are used interchangeably herein to refer to any one or all of cellular telephones, smartphones, personal or mobile multi-media players, personal data assistants (PDA's), laptop computers, tablet computers, smartbooks, palm-top computers, wireless electronic mail receivers, multimedia Internet enabled cellular telephones, wireless gaming controllers, and similar personal electronic devices which include a programmable processor, memory, and transceiver circuitry for conducting group communication with at least one other mobile device.

In overview, various embodiments include methods and systems of communication using a mobile device that includes detecting a movement of the mobile device associated with transitioning from speaker phone mode to earpiece mode, or vice versa, and in response to detecting such movement, automatically transitioning the device to a different mode of operation. In particular, the detected action may be the motion and/or positioning of the device handset, such as the movement of the handset towards or away from the user's ear, and/or the placement of the handset on a surface in a face-up or face-down position. How the device detects the motion and/or positioning of the handset is not considered critical to the various embodiments of the invention. In general, any suitable system or technique for detecting motion, position and/or orientation of a handset, such as accelerometers, gyroscopes, or other sensors, which can be correlated to a particular action of a user may be utilized.

In various embodiments, the movement that is monitored and detected may be a motion of the device corresponding to the user bringing the device to his/her ear. In response to detecting this motion, the device may transition from a public mode of operation (e.g., half-duplex in speakerphone mode) to a private mode of operation (e.g., full duplex earpiece mode or traditional cellphone mode). Similarly, another movement that may be monitored and detected may be a motion of the device corresponding to the user pulling the device away from his/her ear. In response to detecting this motion, the device may transition from a private mode of operation (e.g., full duplex earpiece mode or traditional cellphone mode) to a public mode of operation (e.g., half-duplex in speaker mode).

In these embodiments, the transition between public mode and private mode may entail switching between half-duplex and full-duplex communication. The transition between public mode and private mode may also include a transition from sending/receiving unencrypted data to encrypting the communication session, and vice versa. The transition between public mode and private mode may also include changing the communication pathway of the call, such as routing the call through a different network or server, using a different security mode, or transitioning from a server-mediated communication to a direct peer-to-peer communication between two or more mobile devices.

In further embodiments, the transition between private mode and public mode may also include sending a signal to other device(s) in a group communication session to inform the devices that the user has switched from public mode to private mode or vice versa. The transition between public and private mode in one device may force a similar transition in other device(s) in the group. In some embodiments, the transition between public and private mode on one device may suspend or otherwise suppress communications until one or more other device(s) in the group signal their compliance with the new mode. Suppressing communications may involve suspending forced audio messages from one or more of the mobile devices in the group.

In further embodiments, the device may transition to a different communication infrastructure in response to detecting a motion of the device corresponding to the user either bringing the device to his/her ear or pulling the device away from his/her ear. For example, moving the phone away from the ear may cause the phone to unlock video or other media features, such as by transitioning from 3G to 4G. As another example, moving the phone to the ear may cause the phone to transition to higher-quality voice communication. Transitioning to higher-quality voice communications may include one or more of switching to a higher Quality of Service (QOS), utilizing a wider band codec or changing to a different codec, and activating noise cancellation feature. In some embodiments, moving the device to the ear may cause the device to re-allocate resources (e.g., bandwidth) previously used for streaming video or other media content in order to provide higher-quality voice communication.

In further embodiments, the action that is detected may be the user placing the mobile device down on a stable (and optionally non-moving) surface. In response to this action, the device may remain in an active mode broadcasting received audio from the speaker. While the device is in this active mode, the device may monitor for the presence or proximity of the user, such as by detecting the user's voice, detecting a movement of the device, detecting the use of other device(s) by the user in the vicinity, or using biometric sensors. When the device does not detect the presence of the user for a predetermined time period, the device may enter a non-active communication mode since the user may have stepped away from the device, and thus cannot monitor the communication. In the non-active communication mode, the device may stop broadcasting received audio and enter a mute mode so that others cannot eavesdrop or butt into the conversation. In a further aspect of this embodiment, the device may optionally record or buffer incoming communications for later playback when the user returns. In this embodiment, the user's device may also optionally notify the other device(s) on the call that the user may not be listening or may have stepped away from the device, even though the user's device remains connected to the group communication session. The device may return to an active mode in response to an action of the user (e.g., the user picks up or moves the phone, or the device otherwise detects the user's presence). In a further aspect of this embodiment, the device may terminate the communication after a specified "timeout" period in the non-active communication mode.

In further embodiments, the action that is detected may be the user placing the mobile device face down on a surface, which the device may treat as a command to (1) hang-up or otherwise terminate the communication session, or (2) enter a non-active communication mode as described above. In the case of (2) entering a non-active communication mode, the phone may be configured to hang-up or otherwise terminate the communication session after a specified "timeout" period.

In further embodiments, the device may detect a voice command of a user and send a request to a server for control of the "floor" in a group communication session. Broadly speaking, the fifth embodiment includes "voice-activated" Push-to-Talk (PTT) communication. In various embodiments, the device may send the request for the floor in a PTT communication session upon detecting the user speaking, upon detecting the user speaking at a pre-determined volume, or upon detecting keyword(s) spoken by the user (i.e., using voice recognition software). The detection of silence may trigger release of the floor, which may be after a specified time-out period. In one embodiment, the device may relay voice commands from the user to the server, such as the user commanding the server to grant the user's device floor access. In response to the voice command, the server may queue up or schedule the user's device for floor control when it becomes available.

Further embodiments include methods and systems of communication using a mobile device that includes detecting a movement of the mobile device corresponding to a particular user action, and in response to detecting such movement, automatically establishing a new communication channel with one or more target device(s). In other words, a particular movement of the device (e.g., a rotation, flicking, shaking of the device) triggers a phone call being placed, or the "floor" being requested in a half-duplex communication session, or a video call being started, etc. In embodiments, the new communication channel may be a synchronous communication channel, such as a full-duplex or half-duplex voice or video channel (as opposed to an asynchronous channel, such as e-mail or SMS).

Further embodiments include methods and systems for initiating and/or controlling a half-duplex communication application based on the detected motion of the device handset. For example, during a PTT communication session a first mobile device may detect a first motion and in response to the detected motion, the device may initiate or launch a half-duplex group communication application, such as a Push-to-Talk (PTT) application. A detected second motion may trigger the device to request the "floor" in a half-duplex communication. A detected third motion may trigger the device to release the floor.

The various embodiments may be implemented within a variety of wireless communication systems 100, an example of which is illustrated in FIG. 1. The communication system 100 may include a plurality of mobile devices 102, 104, 106, 108, which may be configured to communicate via cellular telephone network, a radio access network, WiFi network, WiMAX network, and/or other well known technologies. Mobile devices 102, 104, 106, 108 may be configured to receive and transmit voice, data and control signals to and from a base station 110 (e.g., base transceiver station) which may be coupled to a controller (e.g., cellular base station, radio network controller, service gateway, etc.) operable to communicate the voice, data, and control signals between mobile devices and to other network destinations. The base station 110 may communicate with an access gateway 112, which may be a packet data serving node (PDSN), for example, and which may serve as the primary point of entry and exit of wireless device traffic. The access gateway 112 may be implemented in a single computing device or in many computing devices, either within a single network or across a wide area network, such as the Internet.

The access gateway 112 may forward the voice, data, and control signals to other network components as user data packets, provide connectivity to external packet data networks, manage and store contexts (e.g. network internal routing information, etc.) and act as an anchor between different technologies (e.g., 3G and 4G systems). The access gateway 112 may also coordinate the transmission and reception of data to and from the Internet 114, and the transmission and reception of voice, data and control information to and from an external service network connected to the Internet 114 and other base stations 110 and wireless receivers 102, 104, 106, 108.

The access gateway 108 may connect the receiver devices 102 to a service network 116. The service network 116 may control a number of services for individual subscribers, such as management of billing data and selective transmission of data, such as multimedia data, to a specific receiver device 102, 104, 106, 108. The service network 116 may be implemented in a single computing device or in many computing devices, either within a single network or across a wide area network, such as the Internet 114. The service network 116 may typically include one or more servers 120, such as a group communication server described in further detail below.

The mobile device may be, for example, a smartphone 102, 104, a tablet computer 106, a cellular telephone 108, or any other suitable mobile device. In general, the mobile devices may include a platform that can receive and execute software applications, data and/or commands transmitted over the wireless network that may ultimately come from the service network 116, the Internet 114 and/or other remote servers and networks. The mobile device may include a transceiver operably coupled to a processor, which may be an application specific integrated circuit (ASIC), microprocessor, logic circuit, or other data processing device. The processor may execute an application programming interface ("API") layer that interfaces with any resident programs in an internal memory of the mobile device. The internal memory may be comprised of read-only or random-access memory (RAM and ROM), EEPROM, flash cards, or any memory common to computer platforms. The mobile device may also include a local database that stores applications not actively used in memory. The local database is typically a flash memory cell, but may be any secondary storage device as known in the art, such as magnetic media, EEPROM, optical media, tape, soft, or hard disk, or the like. The processor may also be operably coupled to external devices such as an antenna, microphone, speaker, display, keypad or other user input device, such as a touchscreen device, as is known in the art.

In embodiments, the components of the mobile device may be provided in a compact housing (i.e., a "handset") that enables the device to be held and easily manipulated by a user. The mobile device may also include at least one sensor that generates signals that may be interpreted by the processor to determine the motion, position and/or orientation of the device handset at any given time as is known in the art.

In conventional wireless communication systems, a group communication session between two or more mobile devices may be arbitrated by a group communication server or a network of such servers (e.g., collectively illustrated by server 120 in FIG. 1). The subscribers to a particular group communication service (e.g., a push-to-talk (PTT) service, a push-to-transfer (PTX) service, etc.) are thereby permitted to communicate with other subscribers of the same service with messages being exchanged in a PTT communication session either through, or at the control of, the group communication server 120. In the case of a group audio session, this means audio packets may be transmitted to the group communication server 120 via the wireless network from one of the subscriber devices (e.g., mobile devices 102, 104, 106, 108), and the server 120 may forward the audio packets to one or more other subscriber devices actively participating in the group communication session. Likewise, for group sessions involving other types of media (e.g., text messages, multimedia messages including video and/or audio, etc.), other types of data packets may be exchanged between mobile devices of group members, or subscribers, during the session.

In various embodiments, the group communication server 120 may perform arbitration functions between competing demands of the various mobile devices 102, 104, 106, 109 for use of communication channels over the wireless network. For example, in response to a request from wireless communication device 102 to communicate with one or more other target devices in a communication group, including all other devices in the group, the server 120 may establish a communication channel between the requesting device 102 and all or a portion of the requested target devices in the group. The server 120 may thus grant control of the "floor" to the requesting mobile device 102. In a half-duplex communication session, generally only one mobile device may have control of the "floor" at a given time. The mobile device with control of the floor may send voice and/or other data, and the other devices may only receive data. Where there exist competing requests amongst devices of the group for control of the "floor," the server 120 may arbitrate between competing requests based on predetermined priority criteria. The priority criteria may be established at the time of the communication group formation, such as by a group administrator, and stored by the communication server 120. In embodiments, the priority criteria may be default priority criteria stored by server 120. In some embodiments, the priority criteria may be established on an ad hoc basis by one or more of the mobile devices (e.g., 102, 104, 106, 108) in the group. The server 120 may also maintain records for each communication group, including the subscriber devices constituting each group, and may also track the status of each mobile device in the group (e.g., whether the device is available, unavailable, unreachable, etc.).

Figure 2:
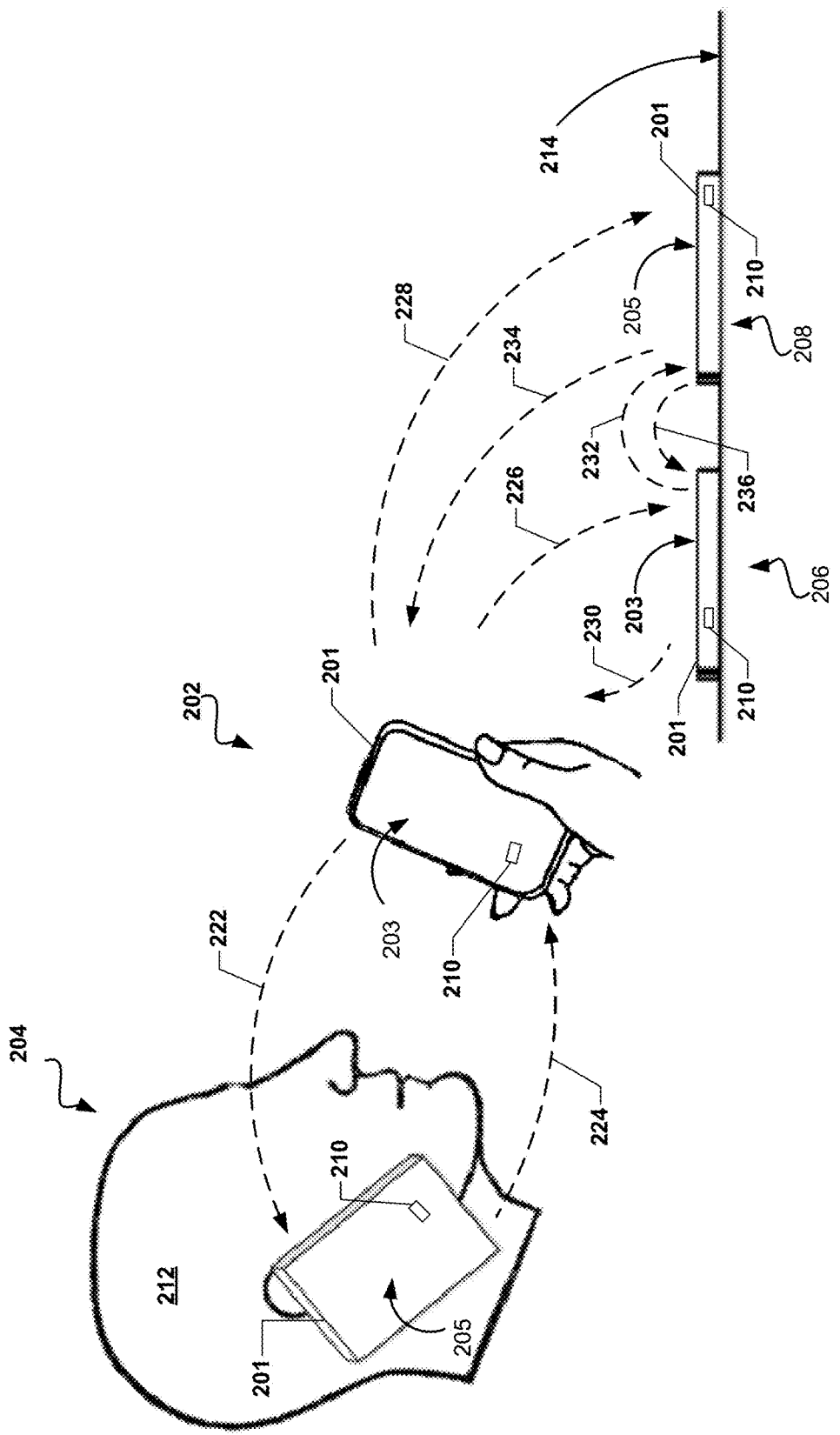
FIG. 2 schematically illustrates positions and movements of a mobile device handset that may be detected by the mobile device according to various embodiments.

Embodiments include methods and systems of communication using a mobile device that includes detecting a movement of the mobile device associated with a particular action by a user of the device, and in response to detecting such movement, transitioning the mobile device to a different mode of operation. In particular, the user action may be a movement of the device handset, such as the movement of the handset towards or away from the user's ear, and/or the placement of the handset on a surface in a face-up or face-down position. FIG. 2 schematically illustrates various movements that may be detected by the mobile device according to various embodiments. FIG. 2 shows a mobile device handset 201 that includes a front surface 203, a rear surface 205 and at least one sensor 210 for detecting the movement of the device. The sensor 210 may be an accelerometer, gyroscope, or other sensors, including combinations of sensors, that may be used to detect a motion and/or change in position/orientation of a handset 201 that may be correlated to a particular action by a user of the device.

FIG. 2 illustrates the handset 201 in a first position 202, which corresponds to the device operating in a public mode. In embodiments, the public mode may be the default operating state for the mobile device in a group communication session. In some embodiments, the sensor(s) 210 may indicate that the device handset 201 is in a position and/or orientation corresponding to operation in a public mode. For example, the sensor(s) 210, by detecting the position, orientation and/or movements of the handset 201, may indicate that the handset 201 is being held in front of the user 212 and away from the user's ear (as shown in FIG. 2), or is within a holster or other holding device, or is in a moving vehicle, or is in any other position/orientation that may be correlated to a public mode of operation. The device operating in a public mode in the first position 202 may operate using speakerphone mode (e.g., providing forced audio over the device loudspeaker), and may communicate over a half-duplex communication channel with one other mobile device in a communication group.

FIG. 2 illustrates the device in a second position 204, in which the handset 201 is positioned proximate the ear of the user 212. This position 204 may correspond to the device operating in a private mode. The sensor(s) 210 may detect a motion of the handset 201 (indicated by dashed line 222) corresponding to a transition between the first position 202 and the second position 204. The sensor(s) 210 may also detect a motion of the handset 201 (indicated by dashed line 224) corresponding to a transition between the second position 204 and the first position 202.

FIG. 2 also illustrates the device in a third position 206, in which the handset 201 is placed on a stable, optionally stationary surface 214, such as a table or desk. In the third position 206, the handset 201 is placed in a "face-up" position with the front surface 203 of the handset 201 faced up towards the user 212. In embodiments, the sensor(s) 210 may be configured to detect when the device handset 201 is in the third position 206. The sensor(s) 210 may also be configured to detect a motion of the handset 201 (indicated by dashed line 226) corresponding to a transition between the first position 202 (or optionally the second position 204) and the third position 206. The sensor(s) 210 may also detect a motion of the handset 201 (indicated by dashed line 230) corresponding to a transition between the third position 206 and the first position 202 (or optionally the second position 204).

FIG. 2 also illustrates the device in a fourth position 208, in which the handset 201 is placed "face-down" on a stable, optionally stationary surface 214, such as a table or desk. In the fourth position 208, the handset 201 is placed in a "face-down" position with the rear surface 205 of the handset 201 faced up towards the user 212. In embodiments, the sensor(s) 210 may be configured to detect when the device handset 201 is in the fourth position 208. The sensor(s) 210 may also be configured to detect a motion of the handset 201 (indicated by dashed line 228) corresponding to a transition between the first position 202 (or optionally the second position 204) and the fourth position 208. The sensor(s) 210 may also detect a motion of the handset 201 (indicated by dashed line 234) corresponding to a transition between the fourth position 208 and the first position 202 (or optionally the second position 204). The sensor(s) 210 may also detect a motion of the handset 201 (indicated by dashed line 232) corresponding to a transition between the third position 206 and the fourth position 208 (i.e., turning the handset 201 over from a face-up to a face-down position). The sensor(s) 210 may also detect a motion of the handset 201 (indicated by dashed line 236) corresponding to a transition between the fourth position 208 and the third position 206.

Figure 3A:
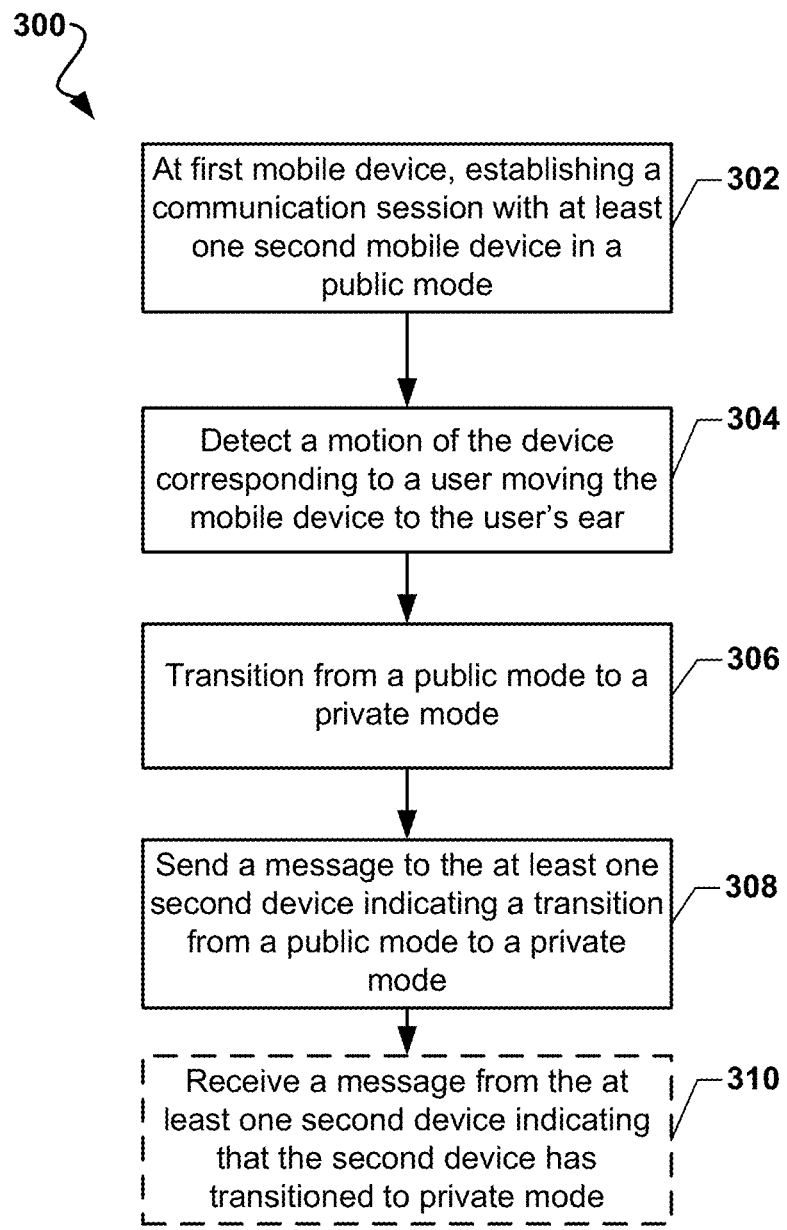
FIG. 3A is a process flow diagram illustrating an embodiment method of transitioning between a public mode of communication and a private mode of communication in a mobile device.

FIG. 3A is a process flow diagram illustrating an embodiment method 300 of transitioning between a public mode of communication and a private mode of communication in a mobile device. In embodiment method 300, a first mobile device, such as mobile device 102 in FIG. 1, may establish a communication session with one or more second mobile device, such as device(s) 104, 106 and/or 108 in FIG. 1, in a public mode in block 302. The first mobile device 102 may detect a motion of the device corresponding to the user bringing the handset to his/her ear in block 304. The detected motion may be the motion corresponding to a transition between the first position 202 and the second position 204, indicated by dashed line 222 in FIG. 2. In response to this detected motion, the device may transition from a public mode to a private mode in block 306. In one example, the transition from a public mode to a private mode may change the audio path of the mobile device, such as causing the device to switch from a speakerphone mode to an earpiece mode. The first mobile device 102 may send a message to the other device(s) in the group communication session to inform the device(s) that the user has switched from public mode to private mode in block 308. In optional block 310, the first mobile device 102 may receive a message from the other device(s) in the group communication session indicating that the other device(s) have also transitioned to private mode.

Figure 3B:
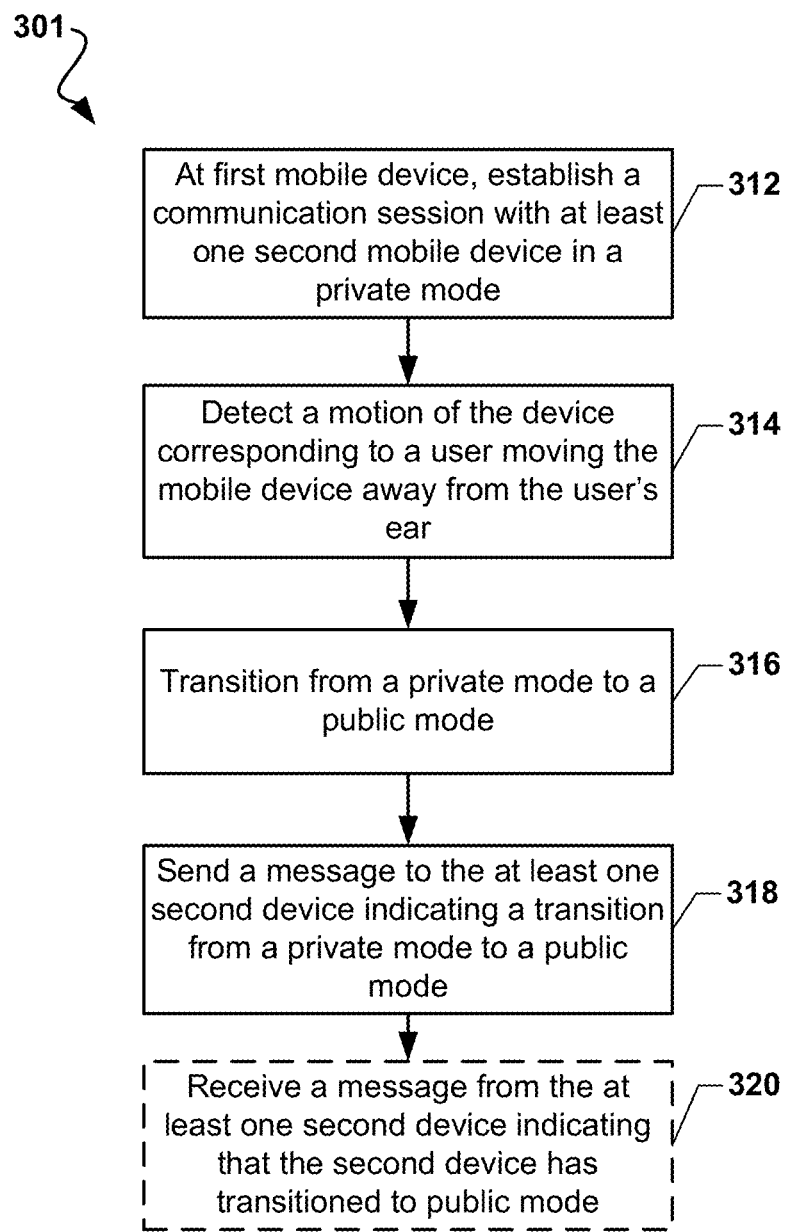
FIG. 3B is a process flow diagram illustrating an embodiment method of transitioning between a private mode of communication and a public mode of communication in a mobile device

FIG. 3B is a process flow diagram illustrating an embodiment method 301 of transitioning between a private mode of communication and a public mode of communication in a mobile device. In embodiment method 301, a first mobile device, such as mobile device 102 in FIG. 1, may establish a communication session with one or more second mobile device(s), such as device(s) 104, 106 and/or 108 in FIG. 1, in a private mode in block 312. The mobile device 102 may be in the second position 204 shown in FIG. 2 with the device handset 201 being held proximate the ear of the user 212, and the device may be operating in earpiece mode while in private mode. The first mobile device 102 may detect a motion of the device corresponding to the user moving the handset away from his/her ear in block 314. The detected motion may be the motion corresponding to a transition between the second position 204 and the second position 202, indicated by dashed line 224 in FIG. 2. In response to this detected motion, the device may transition from a private mode to a public mode in block 306. In one example, the transition from a public mode to a private mode may change the audio path of the device, such as causing the device to switch from earpiece mode to speakerphone mode. The first mobile device 102 may send a message to the other device(s) in the group communication session to inform the device(s) that the user has switched from private mode to public mode in block 318. In optional block 320, the first mobile device 102 may receive a message from the other device(s) in the group communication session indicating that the other device(s) have also transitioned to public mode.

In general, it may typically be assumed that when the user of the first device switches from private mode to public mode (e.g., moves the handset away from his/her ear and switches to speakerphone mode), the user is in a private setting or is otherwise not concerned about the communication session being overheard by third-parties. In some cases, however, the user may not be paying attention to his/her surroundings, and may not realize that he/she has inadvertently transitioned to a public mode during a conversation that is intended to be private. In some embodiments, the first mobile device 102 may provide feedback to the user of the first mobile device (e.g., an audio, visual and/or haptic signal) indicating that the device has transitioned to a public mode, and in some embodiments, the mobile device 102 may suppress and/or buffer incoming audio (e.g., by suspending forced audio messages) until the user indicates his/her assent to the mode switch, as is discussed in further detail below in connection with FIG. 4.

Of course, the user(s) of the other device(s) in the communication session may object to the first user transitioning to public mode in what was initially a private conversation. By sending a message to the other device(s) indicating that the first device has transitioned to public mode, the other user(s) may be made aware that the conversation may be less private than previously assumed, and these users may adjust their conduct accordingly.

Figure 4:
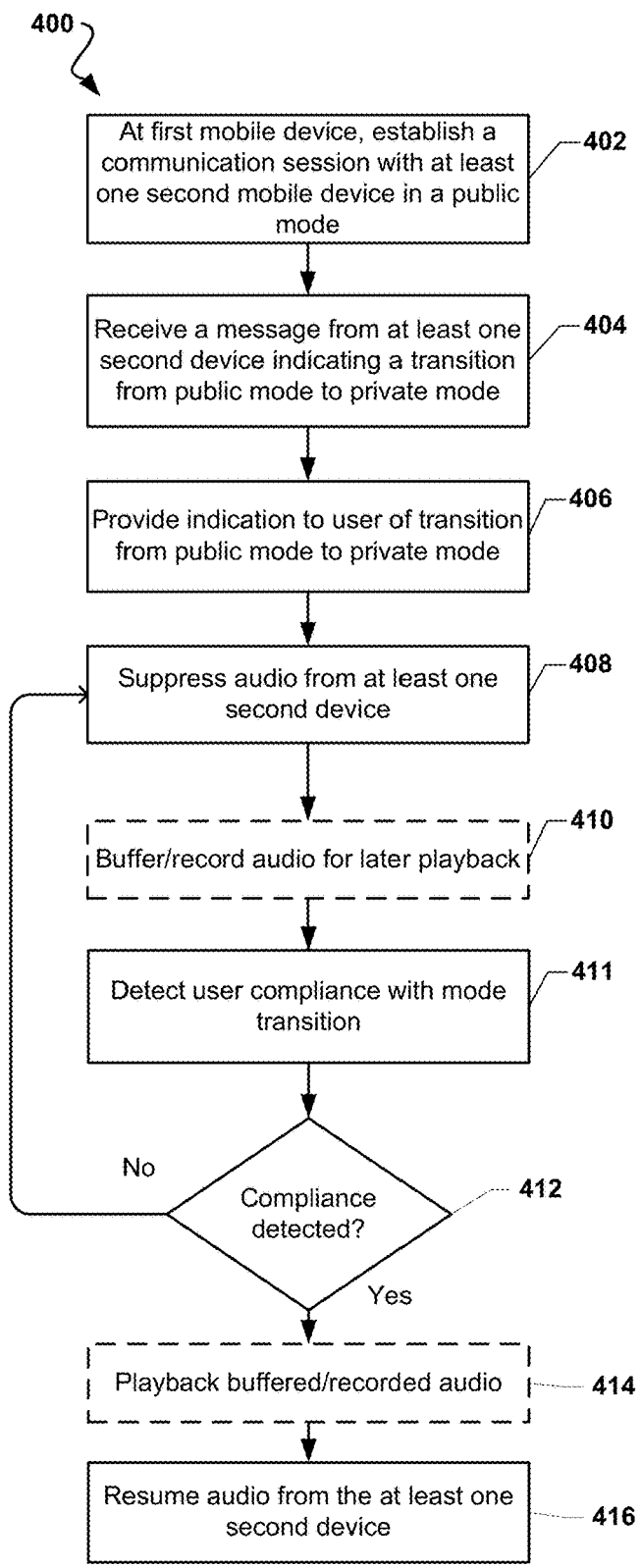
FIG. 4 is a process flow diagram illustrating an embodiment method of group communication using a mobile device wherein at least at least one mobile device in the communication transitions from operating in public mode to operating in private mode.

FIG. 4 is a process flow diagram illustrating an embodiment method 401 of group communication by a plurality of mobile devices in a public mode wherein at least at least one device transitions from operating in public mode to operating in private mode. Embodiment method 401 may be applicable, for example, in connection with embodiment method 300 shown in FIG. 3A, in which the first mobile device transitions from public mode to private mode and sends a message to the at least one second mobile device indicating a transition from public mode to private mode. In this example, embodiment method 401 may be performed by the at least one second mobile device in response to receiving the message from the first device indicating the transition to private mode. Similarly, as shown in FIG. 4, the method 400 may be performed by the first mobile device in response to another mobile device in the group communication session transitioning from a public mode to a private mode.

As shown in FIG. 4, a first mobile device, such as mobile device 102 in FIG. 1, may establish a communication session or be communicating with one or more second mobile device(s), such as device(s) 104, 106 and/or 108 in FIG. 1, in a public mode in block 402. The first mobile device 102 may receive a message from at least one second mobile device indicating that the at least one second mobile device has transitioned from a public mode to a private mode in block 404. As discussed above, this message may be sent by the at least one second mobile device pursuant to block 308 of embodiment method 300 shown in FIG. 3A, and this message may be sent in response to a detected motion of the mobile device, such as the motion from a first position 202 to a second position 204 indicated by dashed line 222 in FIG. 1. In block 406 of embodiment method 400, the first mobile device 102 may provide an indication to the user of the device 102 that the at least one second mobile device has transitioned from a public mode to a private mode. In embodiments, the indication may be a feedback cue (e.g., an audio, visual and/or haptic signal), perceptible to the user of the first mobile device 102, indicating that the at least one other device in the group communication session has transitioned from a public mode to a private mode. The feedback cue may be the cessation of the audio feed from the at least one second mobile device. The user of the first device 102 may thus be notified that at least one other user in the group communication session desires to speak in a more private manner. The first mobile device 102 may also suppress (e.g., suspending, blocking or otherwise preventing audible playing) the audio feed from the device that has transitioned to private mode in block 408. In an embodiment, suppressing communication at the first mobile device may involve suspending forced audio messages from the mobile device. In this way, the audio signals from a user who has transitioned his/her device to private mode (and presumably intending to converse more privately) is not played on a mobile device operating in public mode, which may have the speakerphone enabled and could easily be overheard by third-parties.

While the first mobile device 102 suppresses the audio from the at least one second mobile device operating in private mode, at optional block 410 the first mobile device 102 may buffer or otherwise record the incoming audio feed from the at least one second mobile device for later playback. Suppressing and buffering communication at the first mobile device may involve suspending forced audio messages from the second mobile device. In this way, the user of the first mobile device 102 may chose to hear the "suppressed" portion of the group communication session when the device is in private mode or when the user is in a more private setting.

In embodiments, the first mobile device 102 may continue to buffer or record the audio until the communication session is terminated, or may buffer or record for a pre-determined time period, after which the first mobile device 102 may automatically terminate the call.

In embodiments, the first mobile device 102 may detect the user's compliance with the mode transition from public mode to private mode by the at least one second mobile device in block 411. In some embodiments, the device 102 may detect compliance with the mode transition by detecting motion of the device corresponding to the user bringing the handset to his/her ear. The detected motion may be the motion corresponding to a transition between the first position 202 and the second position 204, indicated by dashed line 222 in FIG. 2. As an alternative to, or in addition to, detecting motion of the device, the first mobile device 102 may detect an input from the user that may be received at a user interface (e.g., a touchscreen display, keypad, etc.) of the device 102 indicating that the user complies with the mode transition. For example, when the device 102 provides the indication to the user of the transition from public mode to private mode by another device in the group communication, the device 102 may provide menu option(s) to the user, such as the option to continue the call in a more private manner (e.g., turn off speakerphone mode and continue the call in earpiece mode), to continue the call in speakerphone mode (e.g., where the user is unconcerned about third-party eavesdropping of the conversation), and/or to terminate the call.

While the user has not indicated compliance with the mode transition (i.e., determination block 412="No"), the first mobile device 102 may continue to suppress audio from the at least one second mobile device at block 408, and may optionally buffer/record the audio from the at least one second mobile device at block 410, until either the group communication is terminated, or in some embodiments, for a pre-determined timeout period, after which the first mobile device 102 may automatically end the call. When the first mobile device 102 detects that the user is compliant with the transition from public mode to private mode (i.e., determination block 412="Yes"), then the first mobile device 102 may resume the audio feed from the at least one second mobile device in block 416. Optionally, the first mobile device 102 may play back the buffered/recorded audio from the at least one second mobile device in optional block 414. The first device 102 may automatically play back the buffered/recorded audio once compliance with the mode transition is detected (i.e., allowing the user to hear the missed portion of the conversation), and may continue to buffer/record the conversation until the recorded portion of the conversation "catches up" to the live audio feed. In other embodiments, the device 102 may continue with the "live" audio feed, and store the buffered/recorded portion of the communication session in memory for later playback.

Embodiment methods include transitioning between a public mode and a private mode in a group communication session based on a detected movement of a mobile device handset. As discussed above, the transition between public mode and private mode may include a change in the audio path of the mobile device. Specifically, a transition between public mode and private mode may trigger a change from speakerphone mode to earpiece mode. Conversely, the transition from private mode to public mode may trigger a change from earpiece mode to speakerphone mode. In addition to changing the audio path of the mobile device, the transition from public mode to private mode may also include additional changes, such as a change in the security settings of the communication session. For example, when the mobile device is operating in public mode (e.g., operating in speakerphone mode where the conversation may be overheard by third-parties), the security of the conversation may not be a paramount concern. In a public mode, a less robust security posture may be maintained than when the device is operating in private mode, where in general the security of the conversation is of greater concern. In some embodiments, the transition between public mode and private mode may include a change in the encryption scheme used in encrypting data transmitted between the mobile devices in a group communication session, and may include embodiments in which no encryption is used when the mobile device is in public mode, and an encryption feature is activated when the device is in private mode.

Figures 5A, 5B:
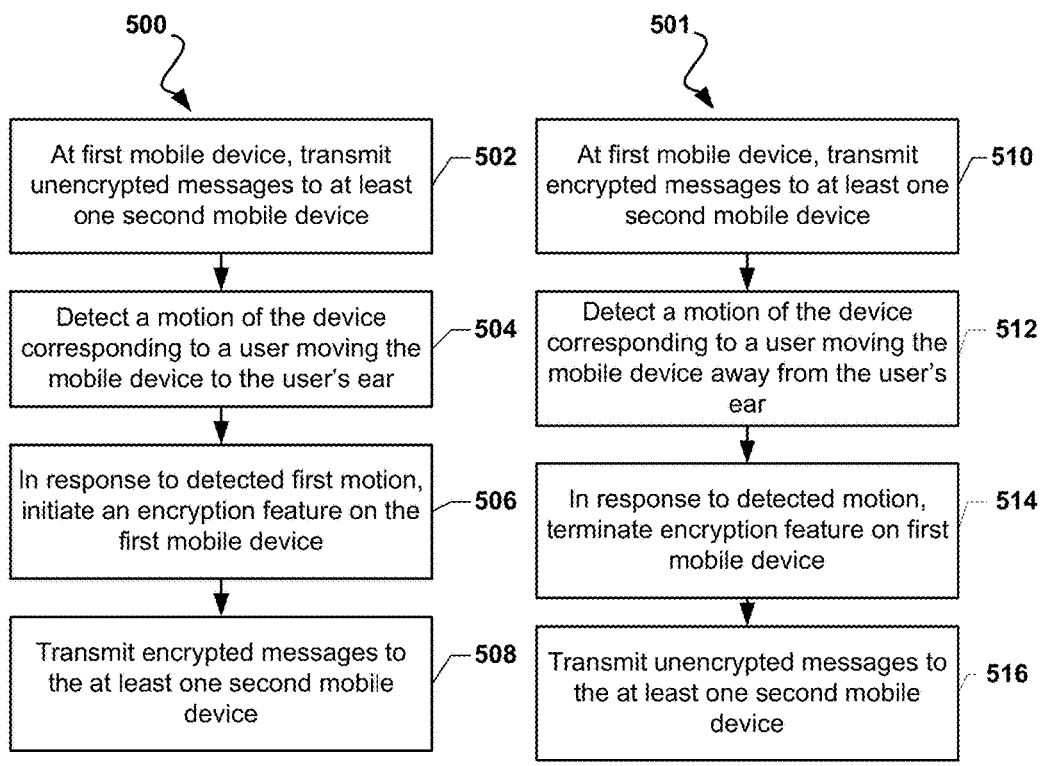
FIG. 5A is a process flow diagram illustrating an embodiment method of transitioning between a public mode of communication associated with a first security setting and a private mode of communication associated with a second security setting in a mobile device.
FIG. 5B is a process flow diagram illustrating an embodiment method of transitioning between a private mode and a public mode that includes changing a security setting of the communication session.

FIG. 5A is a process flow diagram illustrating an embodiment method 500 of transitioning between a public mode of communication associated with a first security setting and a private mode of communication associated with a second security setting in a mobile device. In this exemplary embodiment, the security setting includes the type of encryption used (e.g., the particular encryption algorithm(s) employed) when transmitting voice and/or other data over the wireless network to at least one other mobile device. It will be understood that the change in security setting may alternatively or in addition include transmitting the data over a different (e.g., more or less secure) portion of the wireless network, through a different server or server(s) having varying degrees of security, or over a different network entirely. For example, the change in security setting may be associated with a transition between communicating over an open system and a secure system. The change may also affect how the mobile devices handle cryptographic key exchange, for example.

In block 502 of embodiment method 500, a first mobile device, such as mobile device 102 in FIG. 1, may transmit unencrypted messages to at least one second mobile device, such as device(s) 104, 106 and/or 108 in FIG. 1. The first mobile device 102 may operate in a public mode and may be in a first position 202 such as shown in FIG. 2. The first mobile device 102 may detect a motion of the device corresponding to the user bringing the handset to his/her ear in block 504. The detected motion may be the motion corresponding to a transition between the first position 202 and the second position 204, indicated by dashed line 222 in FIG. 2. In response to this detected motion, the device may initiate an encryption feature on the first mobile device in block 506. The initiation of the encryption feature may be associated with a transition from a public mode to a private mode, which may further include a change in an audio path from a speakerphone mode to an earpiece mode. With the encryption feature initiated, the first mobile device 102 may transmit encrypted messages to the at least one second mobile device in block 508.

In embodiments, a change in security settings on one mobile device, such as the initiation of an encryption feature in embodiment method 500, may force a similar change in other devices that are participating in the group communication session. Thus, changing a security setting in one device (such as the initiation of an encryption feature in block 506 of method 500) may also include sending a message to the other device(s) in the communication session and/or to a central server in order to implement the security setting change across all devices participating in the communication session.

FIG. 5B is a process flow diagram illustrating an embodiment method 501 of transitioning between a private mode and a public mode that includes changing a security setting of the communication session. The embodiment method 501 of FIG. 5B may be the reverse of the embodiment method 500 of FIG. 5A. In block 510 of method 501, the first mobile device 201 may transmit encrypted messages to at least one second mobile device. The first mobile device 102 may operate in a private mode and may be in a second position 204 such as shown in FIG. 2. The first mobile device 102 may detect a motion of the device corresponding to the user moving the device handset away from his/her ear in block 512. The detected motion may be the motion corresponding to a transition between the second position 204 and the first position 202, indicated by dashed line 224 in FIG. 2. In response to this detected motion, the device may terminate an encryption feature on the first mobile device in block 514. The termination of the encryption feature may be associated with a transition from a private mode to a public mode, which may further include a change in an audio path from an earpiece mode to a speakerphone mode. With the encryption feature terminated, the first mobile device 102 may transmit unencrypted messages to the at least one second mobile device in block 516.

As with the embodiment method 500, the change in security setting (e.g., from unencrypted to encrypted transmission) in embodiment method 501 may force a similar change in other devices in the communication session.

Figures 6A, 6B:
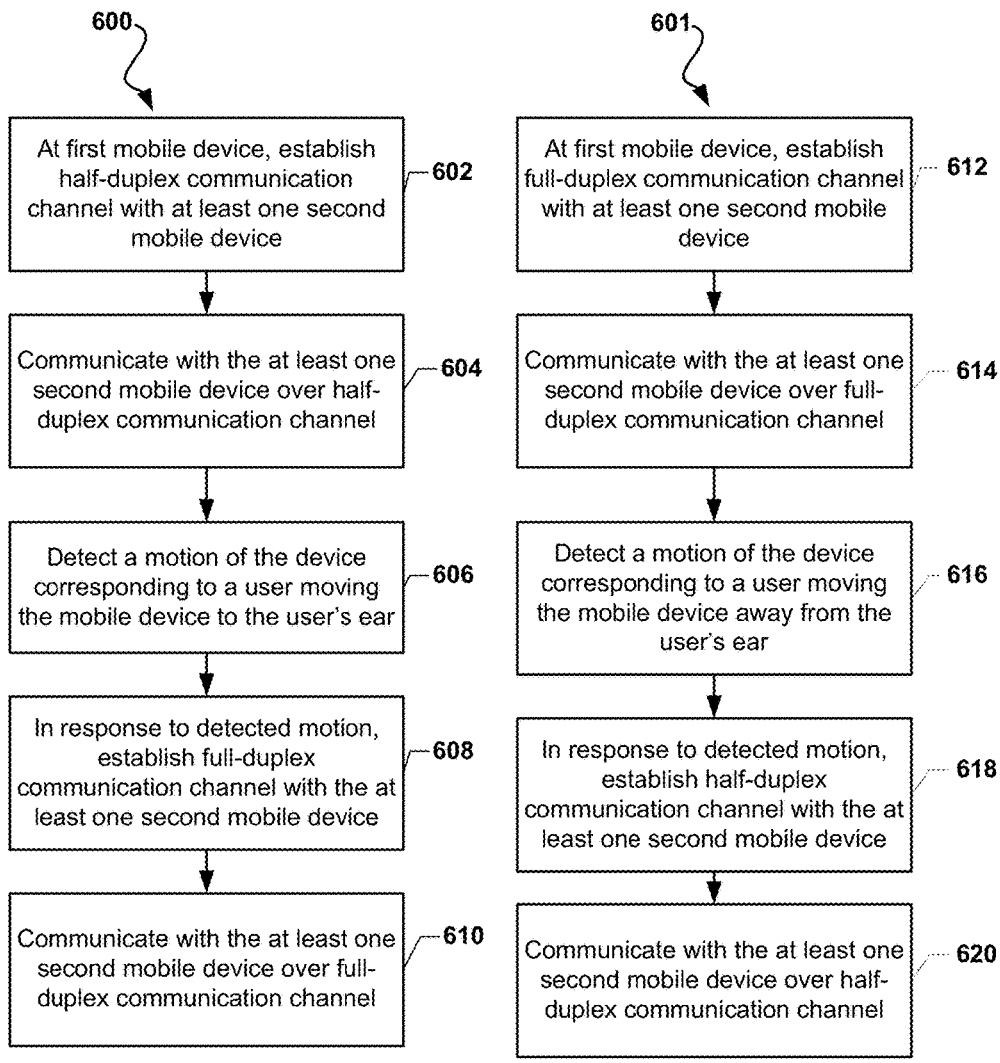
FIG. 6A is a process flow diagram illustrating an embodiment method of transitioning between a public mode associated with half-duplex communication and a private mode associated with full-duplex communication using a mobile device.
FIG. 6B is a process flow diagram illustrating an embodiment method of transitioning between a private mode associated with full-duplex communication and a public mode associated with half-duplex communication using a mobile device.

FIG. 6A is a process flow diagram illustrating an embodiment method 600 of transitioning between a public mode associated with half-duplex communication and a private mode associated with full-duplex communication using a mobile device. As discussed above, embodiment methods include transitioning between a public mode and a private mode in a group communication session based on a detected movement of a mobile device handset, where the transition between public mode and private mode may include a change in the audio path and/or the security settings of the mobile device. Embodiments may also include transitioning between different types of communication, and in particular between half-duplex and full-duplex communication based on the movement of the device handset. As previously noted, during a group communication session, such as a Push-to-Talk session, it is common to operate the mobile device in a "public" mode, with the speakerphone activated to allow the user to hear the often sporadic incoming voice communications and view media content while also making it easier to navigate and manipulate the device interface as needed. When the user desires a more private conversation using the earpiece mode, it may be more natural to communicate over a full-duplex communication link, such as in a conventional phone call. This further has the advantage of avoiding the need to repeatedly request the "floor" every time the user wants to talk, which may be particularly difficult when the device is held to the user's ear and the floor must be requested by touching and/or holding a "virtual" PTT button on a touchscreen interface.

In block 602 of embodiment method 600, a first mobile device 102, such as mobile device 102 in FIG. 1, may establish a half-duplex communication channel with at least one other (i.e., second) mobile device, such as device(s) 104, 106, and/or 108 in FIG. 1. The first mobile device 102 may establish the half-duplex communication channel in coordination with a central server, such as group communication server 120 shown in FIG. 1. The first mobile device 102 may communicate with the at least one second mobile device over the half-duplex communication channel in block 604. The device 102 may communicate in a public mode (e.g., with speakerphone activated) and may be in a first position 202 such as shown in FIG. 2. The first mobile device 102 may detect a motion of the device corresponding to the user bringing the handset to his/her ear in block 606. The detected motion may be the motion corresponding to a transition between the first position 202 and the second position 204, indicated by dashed line 222 in FIG. 2. In response to this detected motion, the device establish a full-duplex communication channel with the at least one second mobile device in block 608. The first mobile device 102 may establish the full-duplex communication channel through the group communication server 120, or through one or more different servers, a different network, or a different portion of the same network. In some embodiments, the first mobile device 102 may establish a direct connection to the at least one second mobile device over a wide area network, such as the Internet 114. The first mobile device 102 may communicate with the at least one second mobile device over the full-duplex communication channel at block 610.

In embodiments, a change from half-duplex to full-duplex communication in the first mobile device may force a similar change in other devices that are participating in the group communication session. Thus, establishing a full-duplex communication channel in block 608 of embodiment method 600 may also include sending a message to the other device(s) in the communication session and/or to one or more servers in order to implement the change to full-duplex communication across all devices participating in the communication session.

FIG. 6B is a process flow diagram illustrating an embodiment method 601 of transitioning between a private mode associated with full-duplex communication and a public mode associated with half-duplex communication using a mobile device. The embodiment method 601 of FIG. 6B may be the reverse of the embodiment method 600 of FIG. 6A. In block 612 of method 601, the first mobile device 201 may establish a full-duplex communication channel with at least one other (i.e., second) mobile device. The first mobile device 201 may communicate with the at least one second mobile device over the full-duplex communication channel in block 614. The first mobile device 102 may operate in a private mode and may be in a second position 204 such as shown in FIG. 2. The first mobile device 102 may detect a motion of the device corresponding to the user moving the device handset away from his/her ear in block 616. The detected motion may be the motion corresponding to a transition between the second position 204 and the first position 202, indicated by dashed line 224 in FIG. 2. In response to this detected motion, the device may establish a half-duplex communication channel with the at least one second mobile device in block 618. The first mobile device 102 may communicate with the at least one second mobile device over the half-duplex communication channel in block 620.

As with the embodiment method 600, the change from full-duplex to half-duplex communication in embodiment method 601 may force a similar change in other devices in the communication session. The first mobile device 102 may establish the half-duplex communication channel in coordination with a server, such as group communication server 120 in FIG. 1.

Figure 7:
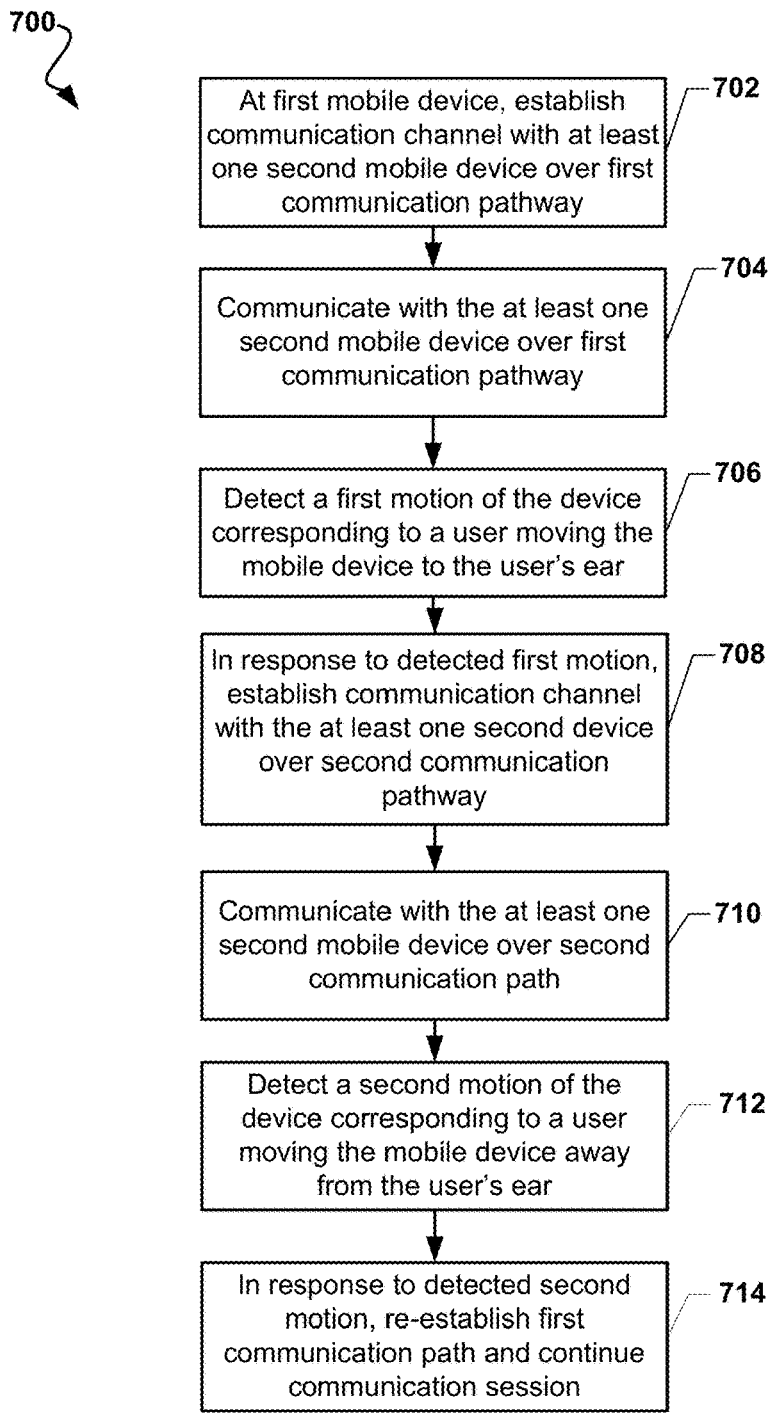
FIG. 7 is a process flow diagram illustrating an embodiment method of transitioning between a public mode associated with communication over a first communication pathway and a private mode associated with communication over a second communication pathway using a mobile device.

FIG. 7 is a process flow diagram illustrating an embodiment method 700 of transitioning between a public mode associated with communication over a first communication pathway and a private mode associated with communication over a second communication pathway using a mobile device. As discussed above, embodiment methods include transitioning between a public mode and a private mode in a group communication session based on a detected movement of a mobile device handset, where the transition between public mode and private mode may include a change in the audio path, the security settings of the mobile device and/or a transition between half-duplex and full-duplex communication. Embodiments may also include transitioning between different communication pathways based on the movement of the device handset. The transition to a different communication pathway may include, for example, communicating over a different network or potion of a network, including communicating through or under the control of a different server or group of servers. The transition to a different communication pathway may be associated with a change in security posture of the communication (e.g., sending data packets through an open system versus a secure system) and/or a change in the type of communication (e.g., a transition between half-duplex and full-duplex communication). In one embodiment, the transition to a different communication pathway may comprise a transition between sending voice and/or other data through a central point (e.g., a server) to a peer-to-peer or point-to-point type model, in which the communicating devices may send the data directly to each other over a wide area network, such as the Internet 114 shown in FIG. 1, without the intervention of a central logical entity, such as group communication server 120 in FIG. 1. In embodiments, the change from a server-mediated communication pathway to a peer-to-peer communication pathway may be associated with a transition from a public mode of communication to a private mode of communication. This may provide additional privacy by eliminating the central server from the loop. The change to a different communication pathway may also allow the network to more efficiently allocate resources. For example, the group communication server 120 may set up a group communication session between devices in a public mode, and when the devices wish for private communication, the server 120 may hand-off the session to the mobile devices, which may establish a direct peer-to-peer connection with the other device(s) in the group based on the known IP addresses of the other device(s). In embodiments, the transition to a different communication pathway may be performed by the mobile device without the knowledge or intervention of the user of the device.

In block 702 of embodiment method 700, a first mobile device 102, such as mobile device 102 in FIG. 1, may establish a communication channel with at least one second mobile device, such as device(s) 104, 106, and/or 108 in FIG. 1, over a first communication pathway. The first mobile device 102 may establish the first communication pathway through a central server, such as group communication server 120 shown in FIG. 1. The first mobile device 102 may communicate with the at least one second mobile device over the first communication pathway in block 704. The device 102 may communicate in a public mode (e.g., with speakerphone activated) and may be in a first position 202 such as shown in FIG. 2. The first mobile device 102 may detect a motion of the device corresponding to the user bringing the handset to his/her ear in block 706. The detected motion may be the motion corresponding to a transition between the first position 202 and the second position 204, indicated by dashed line 222 in FIG. 2. In response to this detected motion, the device establish a communication channel with the at least one second mobile device over a second communication pathway in block 708. The second communication pathway may be through a different network or server, or through a different portion of the network. In embodiments, the second communication pathway may be a peer-to-peer pathway, as described above. The first mobile device 102 may communicate with the at least one second mobile device over the second communication pathway at block 710.

The first mobile device 102 may detect a motion of the device corresponding to the user moving the device handset away from his/her ear in block 712. The detected motion may be the motion corresponding to a transition between the second position 204 and the first position 202, indicated by dashed line 224 in FIG. 2. In response to this detected motion, the device may re-establish the first communication pathway and continue the communication session with the at least one second mobile device in block 714. In embodiments, the transition from the second communication pathway back to the first communication pathway may include a transition from a peer-to-peer communication pathway to a server-mediated pathway, and may include sending a request to a central server, such as group communication server 120, to establish a group communication session between the mobile devices.

In embodiments, a change from the first communication pathway to the second communication pathway, and vice versa, in the first mobile device may force a similar change in other devices that are participating in the group communication session.

Figure 8:
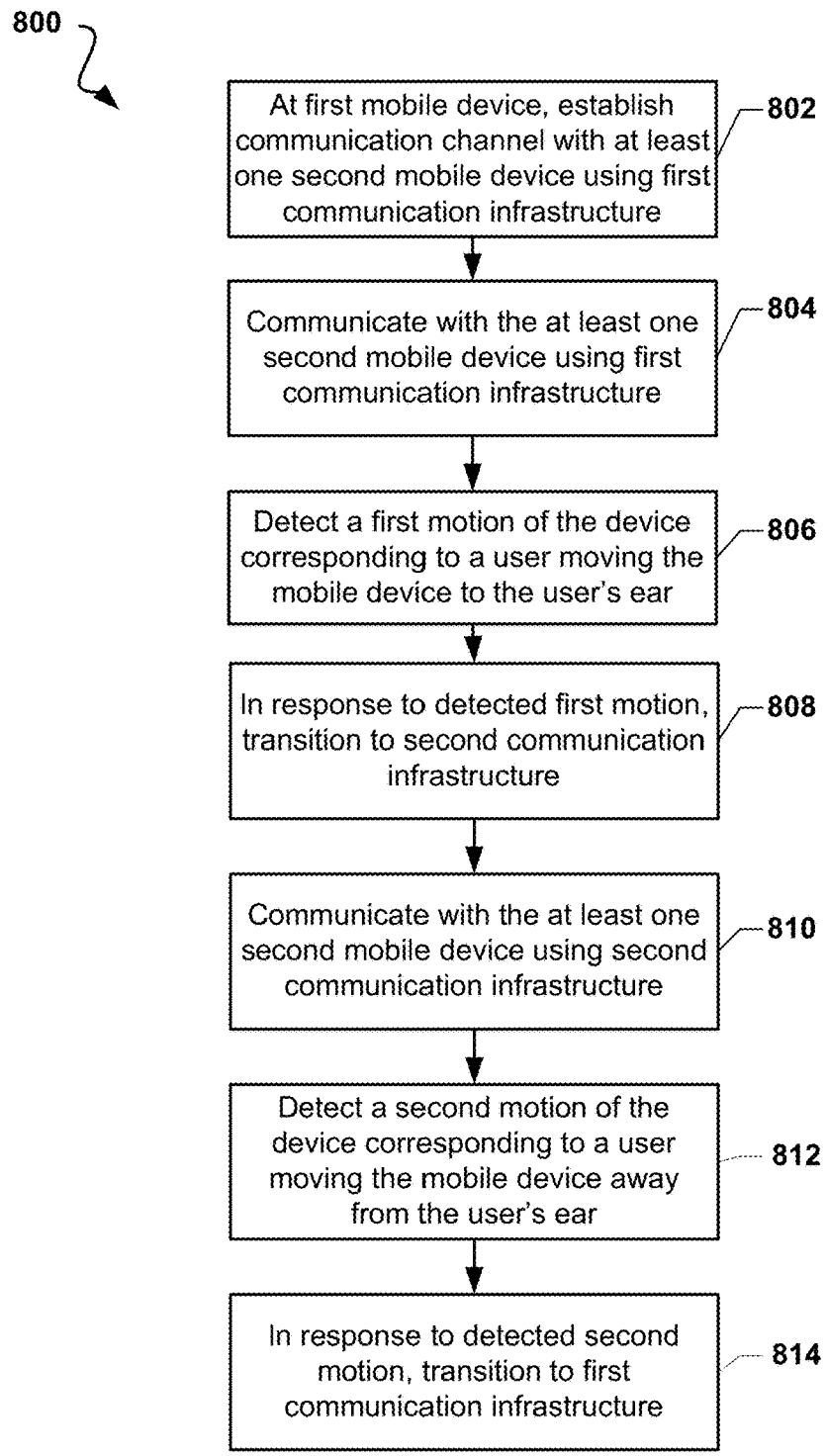
FIG. 8 is a process flow diagram illustrating an embodiment method of transitioning between a public mode associated with communication using a first communication infrastructure and a private mode associated with communication using a second communication infrastructure using a mobile device.

FIG. 8 is a process flow diagram illustrating an embodiment method 800 of transitioning between a public mode associated with communication using a first communication infrastructure and a private mode associated with communication using a second communication infrastructure using a mobile device. The transition to a different communication infrastructure may include, for example, transition to different types of communication capabilities, modem capabilities, video and other media capabilities, etc., based on the detected movement of the device handset.

The transition to a different communication infrastructure may include a transition to a different Quality of Service (QoS) for the call, or use of different codecs for higher or lower quality audio transition. In embodiments, the transition may enable or disable media features, such as video features, and could, for example, include a transition between a 3G and a 4G network infrastructure. Generally speaking, according to some embodiments, the detected movement of the user brining the handset towards his/her ear may trigger enhanced audio features, such as changing to a higher QoS and/or a wider band codec (i.e., using a different codec), use of noise cancellation features, etc. Conversely, the detected movement of the user moving the device handset away from his/her ear may enable enhanced video and/or multimedia features. In embodiments, the mobile device may reallocate resources, such as bandwidth, based on the detected movement of the device handset. For example, when the device handset is held away from the user's ear, the device may allocate certain resources to multimedia functions, such as sending and receiving media files, viewing videos and pictures, etc. When the user moves the handset to his/her ear, there may be less need to support multimedia functions, and the resources previously used to support these functions may be reallocated to higher quality audio (i.e., voice) communication. The resources may be reallocated back to multimedia functions when the user moves the handset away from his/her ear.

In block 802 of embodiment method 800, a first mobile device 102, such as mobile device 102 in FIG. 1, may establish a communication channel with at least one other (i.e., second) mobile device, such as device(s) 104, 106, and/or 108 in FIG. 1, using a first communication infrastructure. The first mobile device 102 may communicate with the at least one second mobile device using the first communication infrastructure in block 804. The device 102 may be in a first position 202 such as shown in FIG. 2. The first mobile device 102 may detect a motion of the device corresponding to the user bringing the handset to his/her ear in block 806. The detected motion may be the motion corresponding to a transition between the first position 202 and the second position 204, indicated by dashed line 222 in FIG. 2. In response to this detected motion, the device may transition to a second communication infrastructure in block 808. The first mobile device 102 may communicate with the at least one second mobile device using the second communication infrastructure at block 810. The first mobile device 102 may detect a motion of the device corresponding to the user moving the device handset away from his/her ear in block 812. The detected motion may be the motion corresponding to a transition between the second position 204 and the first position 202, indicated by dashed line 224 in FIG. 2. In response to this detected motion, the device may transition back to the first communication infrastructure in block 814.

Figure 9:
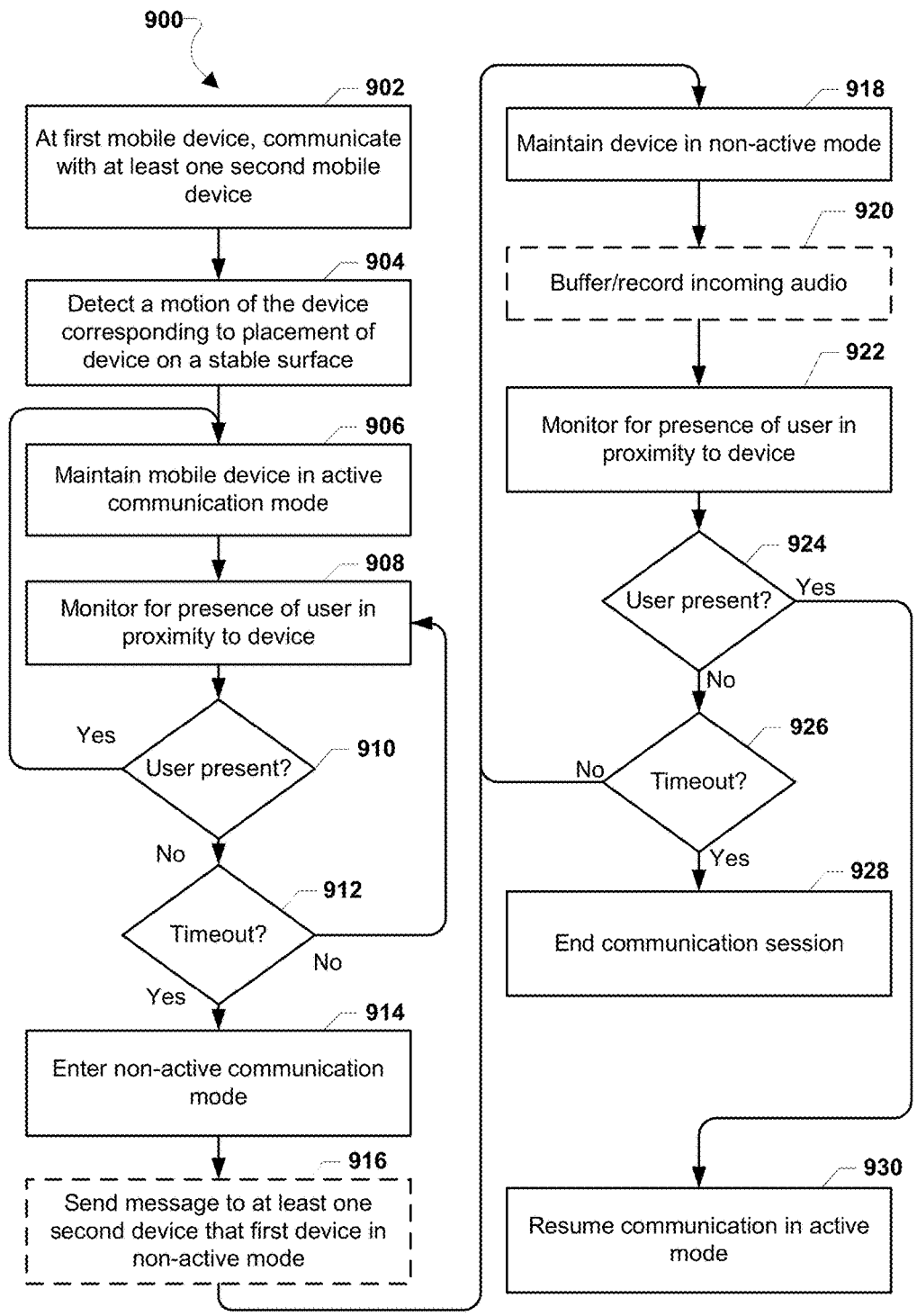
FIG. 9 is a process flow diagram illustrating an embodiment method of modifying the operating mode of a mobile device in response to a detected movement of the device corresponding to the user placing the mobile device on a surface.

FIG. 9 is a process flow diagram illustrating an embodiment method 900 of modifying the operating mode of a mobile device in response to a detected movement of the device corresponding to the user placing the mobile device on a surface. In embodiments, the detected movement of placing the mobile device on a surface may cause the device to enter an active mode in which the device continues to participate in an active communication session while monitoring for the presence of the user in proximity to the device. While the user is holding the device handset (e.g., the handset is in the first position 202 shown in FIG. 2), it may be assumed that the user intends to actively participate in the group communication session, or at the very least is in a position to listen to incoming audio. However, when the user places the handset down on a surface (e.g., the handset is in the third position 206 shown in FIG. 2), it may be the case that the user is still listening/participating in the communication session. However, it may also be the case that the user has become distracted, is on another call using another device, has left the room, etc.—i.e. is no longer participating in the call. In various embodiments, when the mobile device detects that it has been placed on a surface, the device may monitor for the presence of the user and continue the communication in an active mode so long as the user is detected nearby. When the user is not detected, the device may infer that the user is not paying attention to the call anymore, and may take an appropriate action, such as muting the incoming audio feed, buffering/recording the incoming talk spurts, notifying the other devices that the user of the first device may not be listening, and/or terminating the communication session.

In block 902 of embodiment method 900, a first mobile device 102, such as mobile device 102 in FIG. 1, may communicate with at least one other (i.e., second) mobile device, such as device(s) 104, 106, and/or 108 in FIG. 1, in a group communication session. The first mobile device 102 may detect a motion of the device corresponding to a placement of the device on a stable surface in block 904. The detected motion may be the motion corresponding to a transition between the first position 202 and the third position 206, indicated by dashed line 222 in FIG. 2. In some embodiments, the device may discriminate between the user putting the device down on stationary surface and the user putting the device down on a moving surface, such as when the device is in a moving vehicle, in which case it may be assumed that the user is still paying attention to the communication session. In embodiments, the device may also differentiate between the user putting the device down "face-up" (illustrated by the third position 206 in FIG. 2) and putting the device down "face-down" (illustrated by the fourth position 208 in FIG. 2), which may cause the device to enter a separate operating mode described in further detail below. In other embodiments, the device may not differentiate between a "face-up" and a "face-down" orientation.

In response to the detected motion of the device in block 904, the mobile device 102 may enter an active mode in which the device maintains active in the communication session in block 906. When in the active mode, the device 102 may monitor for the presence of the user in proximity to the device in block 908. To determine the presence of the user, the device may use any suitable technique for inferring the presence of the user, such as the user picking up or moving the device, biometric detection techniques, voice recognition, etc.

While the device detects the presence of the user (i.e., determination block 910="Yes"), the device 102 may remain in active mode in block 906 and may continue to monitor for the presence of the user in block 908. When the user is not detected (i.e., determination block 910="No"), the device 102 may wait a predetermined timeout period. During the timeout period (i.e., determination block 912="No"), the device may continue to monitor for the user in block 908. If the user is detected, the device may remain in active mode and re-set the timeout period. Upon the expiration of the timeout period (i.e., determination block 912="Yes") the device 102 may enter a non-active communication mode in block 914.

In embodiments, when the device 102 enters a non-active communication mode, it may be inferred that the user is no longer listening to or participating in the group communication session. Upon entering the non-active communication mode, the device 102 may mute or otherwise suppress the incoming audio and/or video feed. Optionally, the first mobile device 102 may send a message to the at least one second mobile device to indicate that the first mobile device 102 is in a non-active communication mode in block 916. Thus, the other participants in the session may be informed that the user of the first mobile device 102 may not be paying attention to the call. In an embodiment, suppressing communication may involve suspending forced audio messages from the other mobile devices in the group. The device 102 optionally may provide feedback to the user that the device is entering non-active communication mode (e.g., the device may provide a beep or audio tone, the display screen or an indicator light may flash yellow, etc.). The device 102 may remain in a non-active communication mode in block 918. Optionally, while the device is in non-active communication mode, the device may buffer or otherwise record incoming voice and/or other data for later playback in optional block 920. The device 102 may continue to monitor for the presence of the user in block 922. Thus, if for example the user has stepped out of the room and returns while the device is in non-active communication mode, the device may detect the presence of the user (i.e., determination block 924="Yes"), and the device may resume the communication session in an active mode in block 930.

In embodiments, the device 102 may remain in a non-active communication mode for a pre-determined timeout period. The timeout period may be the same as or different than the timeout period while the device is in active mode. In embodiments, either or both timeout periods may be set or modified by the user. During the timeout period (i.e., determination block 926="No") the device may remain in a non-active communication mode, monitoring for the presence of the user and optionally buffering or recording incoming communications. After the expiration of the timeout period (i.e., determination block 926="Yes"), assuming the user's presence has not been detected (i.e., determination block 924="No"), the device 102 may end the communication session in block 928.

It will be noted that while the device is in active mode or non-active communication mode as described above, the device 102 may detect a motion of the device handset corresponding to the user picking up the handset from the surface (e.g., the motion indicated by dashed line 230 in FIG. 2), and the detection of this motion may be sufficient to return the device to a normal communication mode (such as the public mode and/or private mode described above).

Figure 10:
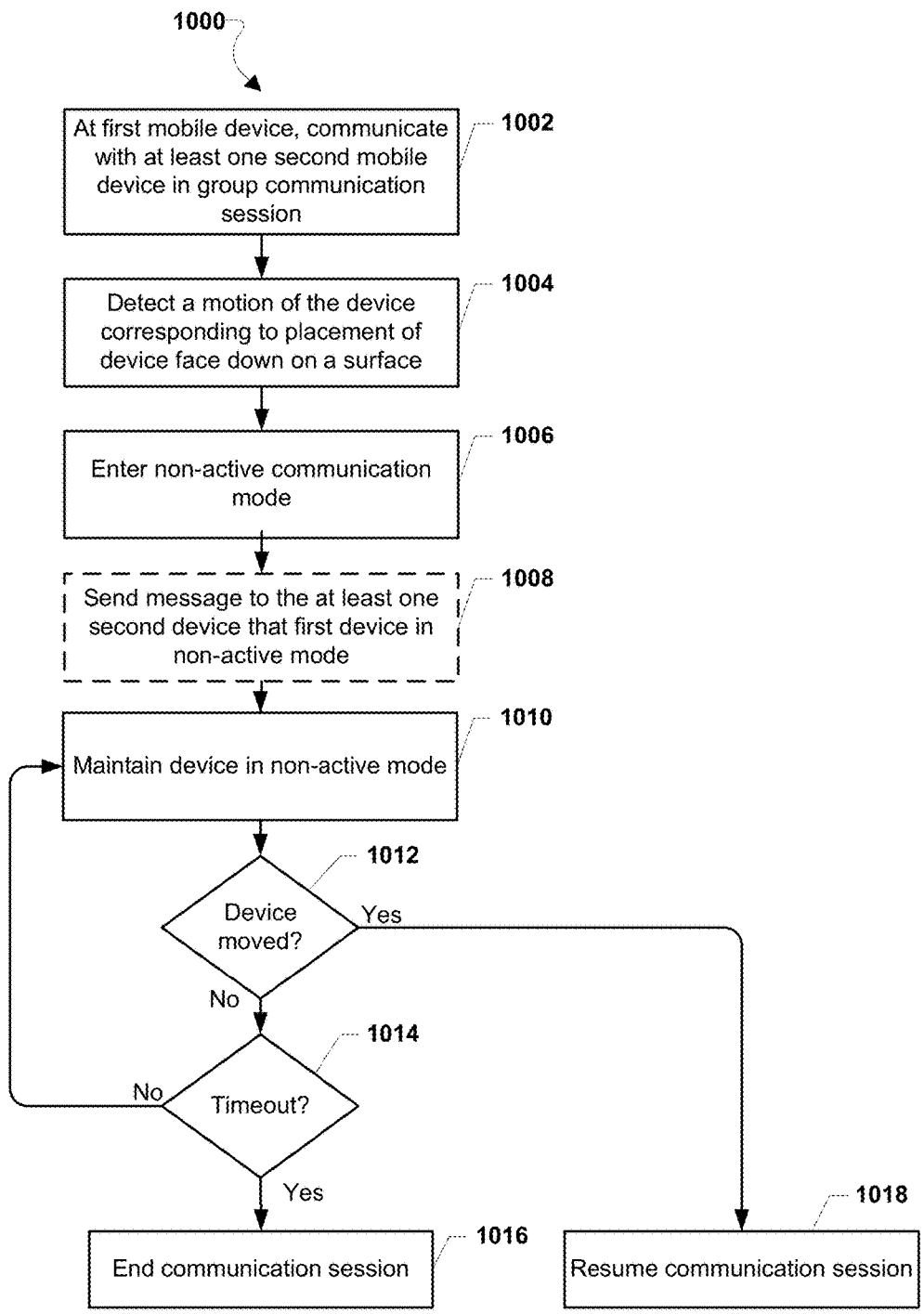
FIG. 10 is a process flow diagram illustrating an embodiment method of modifying the operating mode of a mobile device in response to a detected motion of the device corresponding to the user placing the mobile device face-down on a surface.

FIG. 10 is a process flow diagram illustrating an embodiment method 1000 of modifying the operating mode of a mobile device in response to a detected motion of the device corresponding to the user placing the mobile device face-down on a surface. Embodiment method 1000 is similar to embodiment method 900 described above, except that in this method the detected movement of placing the mobile device handset "face down" on a surface may cause the device to directly enter a non-active communication mode. By the action of the user placing the handset face down on a surface (e.g., the handset is moved to the fourth position 208 shown in FIG. 2), it may be inferred that the user no longer wishes to participate in the communication session. The device may thus enter a non-active communication mode and take appropriate action, such as muting the incoming audio feed, buffering/recording the incoming talk spurts, notifying the other devices that the user of the first device may not be listening, and/or terminating the communication session.

In block 1002 of embodiment method 1000, a first mobile device 102, such as mobile device 102 in FIG. 1, may communicate with at least one other (i.e., second) mobile device, such as device(s) 104, 106, and/or 108 in FIG. 1, in a group communication session. The first mobile device 102 may detect a motion of the device corresponding to a placement of the device face down on a surface in block 1004. The detected motion may be a motion indicated by dashed lines 222 or 232 in FIG. 2.

In response to the detected motion in block 1002, the device 102 may enter a non-active communication mode in block 1006. In embodiments, when the device 102 enters a non-active communication mode, it may be inferred that the user no longer intends to participate in the group communication session. Upon entering the non-active communication mode, the device 102 may mute or otherwise suppress the incoming audio and/or video feed. Optionally, the first mobile device 102 may send a message to the at least one second mobile device to indicate that the first mobile device 102 is in a non-active communication mode in block 1008. Thus, the other participants in the session may be informed that the user of the first mobile device 102 does not intend to continue the session. In an embodiment, suppressing communications may involve suspending forced audio messages from at least one other mobile device. The device 102 may remain in a non-active communication mode in block 1010. As in the embodiment method 900 of FIG. 9, while the device is in the non-active communication mode, the device may buffer or otherwise record incoming voice and/or other data for later playback.

The device 102 may remain in a non-active communication mode for a pre-determined timeout period (i.e., determination block 1014="Yes"). The timeout period may be the same as or different than the timeout periods described above in connection with embodiment method 900. In general, the timeout period in embodiment method 1000 may be relatively short (e.g., 5-10 seconds, optionally less than 5 seconds, such as 1-2 seconds or less), since the placement of the device handset in a face down position may indicate that the user does not wish to continue the communication session. However, the user may have inadvertently placed the device in a face down position, and the timeout period may give the user an opportunity to exit the non-active communication mode and resume the communication session. As shown in FIG. 10, for example, while the device is in the non-active communication mode, the device may determine whether the device has been moved. If the device has been moved (i.e., determination block 1012="Yes"), then the device may exit the non-active communication mode and resume the communication in block 1018. In some embodiments, any detected movement of the device 102 during the non-active communication mode may be sufficient to exit the non-active communication mode and return to the communication session. In other embodiments, the non-active communication mode may be exited by picking up the handset from the surface (e.g., the motion indicated by dashed line 230 in FIG. 2) and/or by turning the handset over to a "face-up" position (e.g., the motion indicated by dashed line 236 in FIG. 2).

Figure 11A:
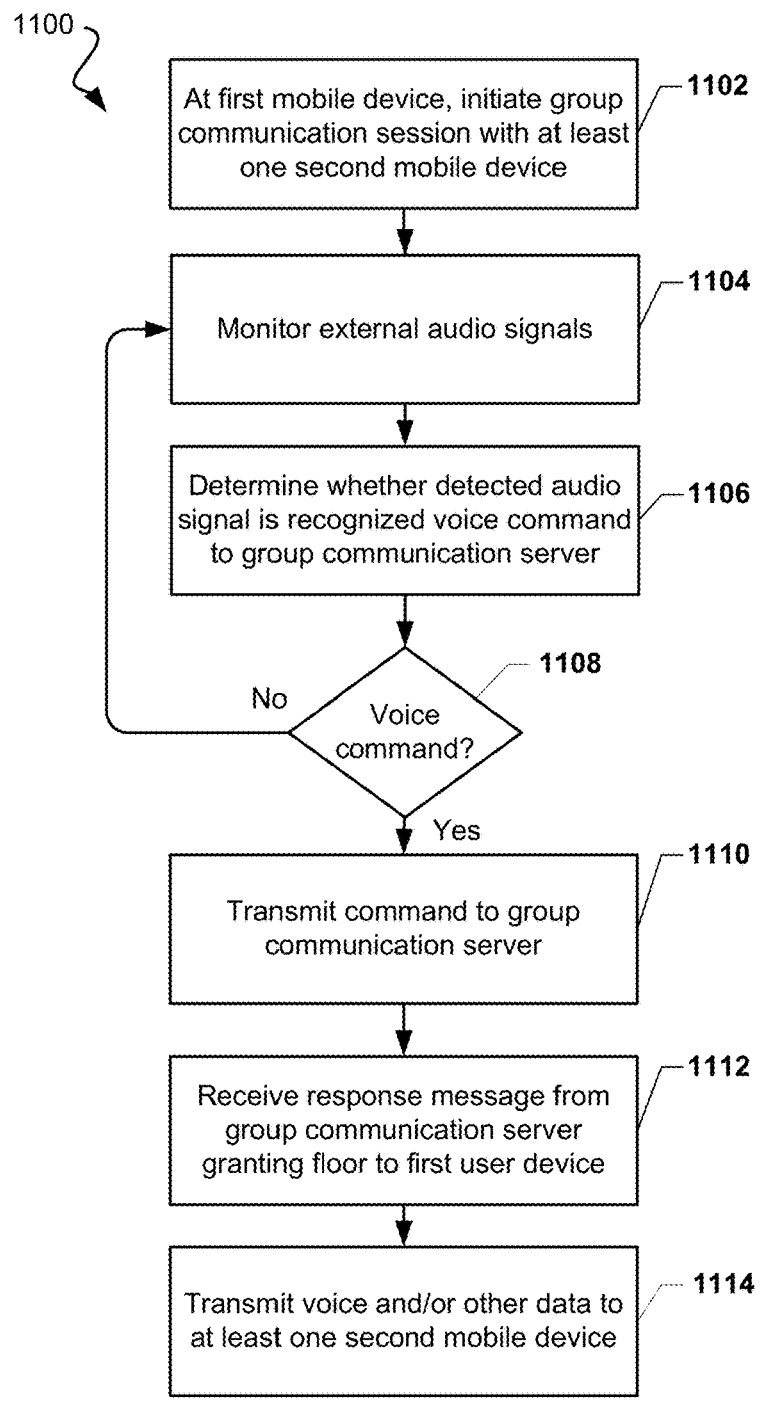
FIG. 11A is a process flow diagram illustrating an embodiment method of voice activated half-duplex communication using a mobile device.

FIG. 11A is a process flow diagram illustrating an embodiment method 1100 of voice activated half-duplex (e.g., Push to Talk) communication using a mobile device. In this embodiment, the mobile device may detect a voice command of a user and in response may send the command to a server, such as the group communication server 120 shown in FIG. 1. In various embodiments, the command may be request to the server for control of the "floor" in a half-duplex group communication session.

In block 1102 of embodiment method 1100, a first mobile device, such as mobile device 102 in FIG. 1, may communicate with at least one other (i.e., second) mobile device, such as device(s) 104, 106, and/or 108 in FIG. 1, in a group communication session. The group communication session may be a half-duplex communication session, such as a Push-to-Talk communication session. The group communication session may be under the control of a central server, such as group communication server 120 shown in FIG. 1. The server 120 may arbitrate control of the "floor" for half-duplex communication between the mobile devices participating in the communication session (i.e., the communication group).

The first mobile device 102 may monitor external audio signals in block 1104. In embodiments, the device 102 may use the device's microphone to "listen" for certain external sounds, such as the voice of a user of the device. The device 102 may monitor the external audio when the device is not actively transmitting voice data (i.e., when the device has not been granted the "floor"). The first mobile device 102 may determine whether a detected audio signal is a recognized voice command to a group communication server in block 1106. In some embodiments, this may include analyzing the detected audio signal (e.g., using voice recognition software) to determine if it corresponds to a command to the group communication server. In embodiments, the first mobile device 102 may analyze the detected audio signal for particular keyword(s) associated with a command, for example. In other embodiments, the first mobile device 102 may simply listen for the sound of the user's voice, and when the user's voice is detected the device 102 may transmit the audio signal to the group communication server 120. The server may include functionality to analyze and interpret the transmitted voice command. In embodiments, the first mobile device 102 may detect the sound of the user's voice, and if the voice is detected above a pre-determined threshold volume, the device will treat the detected voice signal as a voice command to the group communication server.

The first mobile device 102 may continue to monitor external audio signals when no recognized voice command is detected (i.e., determination block 1108="No"). When the first mobile device 102 detects a voice command (i.e., determination block 1108="Yes"), the device may transmit the command to the group communication server 120 in block 1110. As discussed above, in some embodiments the first mobile device 102 may analyze and interpret the voice command, using voice recognition software for example, and prior to transmitting the command, convert the signal into an appropriate data format that may be recognized by the server. In other embodiments, the mobile device 102 may simply relay the voice command from the user to the server, where the server may analyze and interpret the voice command. The first mobile device 102 may optionally provide feedback to the user that a voice command has been received at the device 102 and forwarded to the server 120.

The voice command may be any command used in a group communication session, such a command to commence a communication session with a particular communication group, to terminate the session, to add or drop group members from a communication session, to send or download media files, and so forth. In particular, the voice command may be a command to request the floor in a group communication session. In some embodiments, the detection of the user speaking (optionally above a threshold volume level) may be sufficient to cause the mobile device 102 to request control of the floor from the group communication server 120. In embodiments, the user may simply begin speaking without waiting for floor access. Upon detection of the user's voice, the mobile device 102 may transmit a request for the floor and buffer or otherwise record the user's message while waiting for floor access. When floor access is granted by the server, the device 102 may transmit the buffered message to the communication group. In other embodiments, the user may explicitly request the floor using a voice command (e.g., "floor," "I want the floor," etc.), and then wait until the server grants the floor before transmitting his/her message. In contrast to some half-duplex group communication systems, which may require a user to repeatedly request the floor (such as by pressing a Push-to-Talk button) until the floor is open, embodiments of the present voice activated group communication method and system may enable the user to request the floor once, via a voice command, and then wait for the floor to be granted by the group communication server 120. The first mobile device may receive a response message from the group communication server 120 indicating the floor has been granted to the user's device in block 1112, and the first mobile device 102 may transmit voice and/or other data to the at least one second mobile device in block 1114. The first mobile device 102 may optionally provide feedback to the user that the floor has been granted by the server.

Figure 11B:
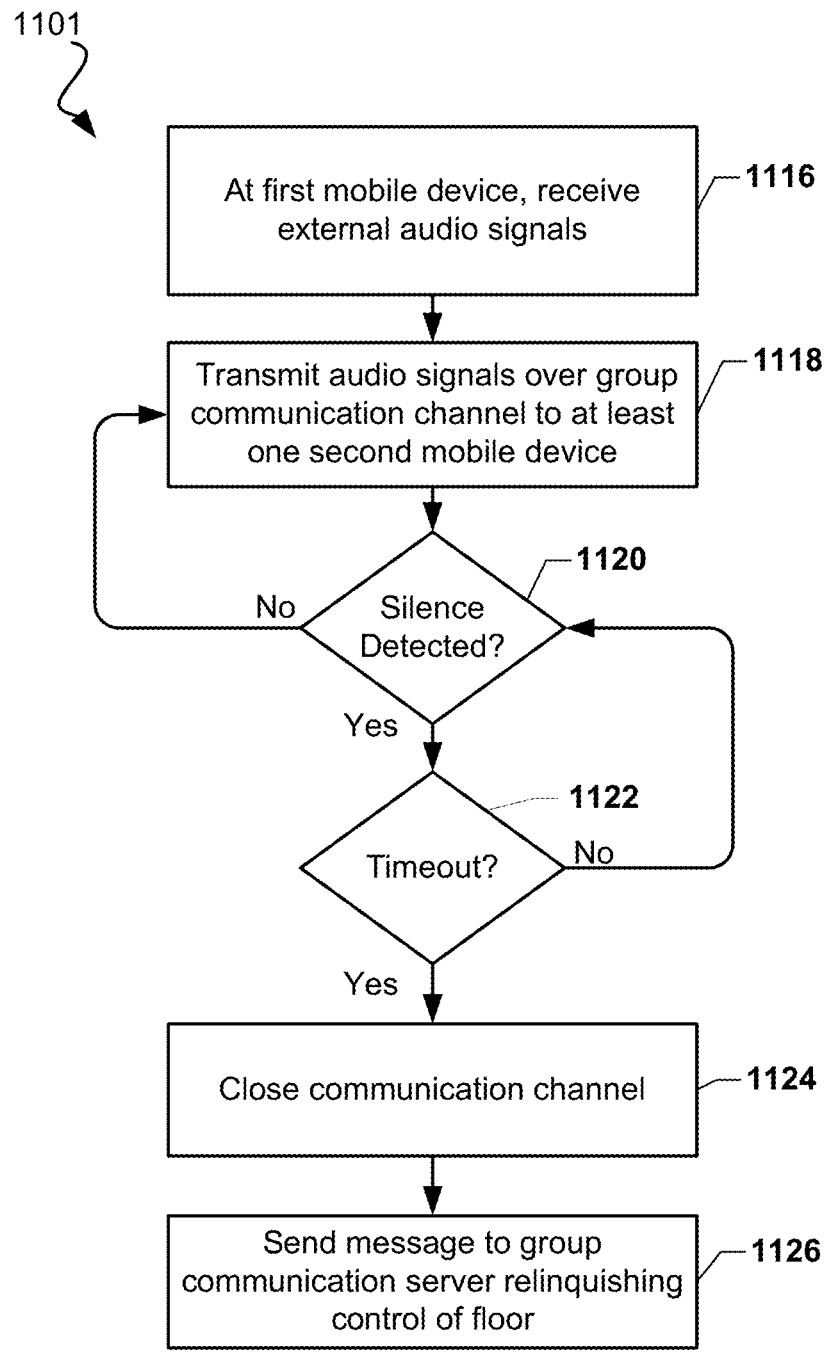
FIG. 11B is a process flow diagram illustrating an embodiment method of half-duplex communication using a mobile device wherein the device relinquishes control of the floor based on the silence of the user.

When the user is finished speaking, the user may relinquish the floor using any suitable means, such as by pressing a button or key on a user interface, or by touching a touchscreen interface. In embodiments, the floor may be relinquished using a voice command (e.g., a particular keyword or keyword string, not likely to be used in regular conversation). FIG. 11B is a process flow diagram illustrating an embodiment method 1101 in which the mobile device may detect when the user has finished speaking (i.e., when the user is silent), and based on the detected silence the device may relinquish control of the floor. The first mobile device 102 may receive external audio signals, such as the user's voice, in block 1116, and transmit the signals (e.g., voice data) over the group communication channel to at least one second mobile device in block 1118. While the mobile device 102 continues to detect external sound (i.e., determination block 1120="No"), the device 102 may continue to transmit the voice data to the other device(s) in block 1116. When the device 102 detects silence (i.e., determination block 1120="Yes"), the detected silence may trigger the start of a timeout period. The timeout period may have a duration that is sufficient to infer that the user has finished speaking and would like to relinquish control of the floor (e.g., generally around 1 second or more). During the timeout period (i.e., determination block 1122="No"), the device may continue to monitor for external audio signals, and if such signals are detected (i.e., determination bock 1120="No"), the device may continue to transmit the signals in block 1118 and restart the timeout period when the device next detects silence. When the timeout period expires (i.e., determination block 1122="Yes"), the device 102 may close the communication channel in block 1124 and send a message to the group communication server relinquishing control of the floor in block 1126.

Figure 11C:
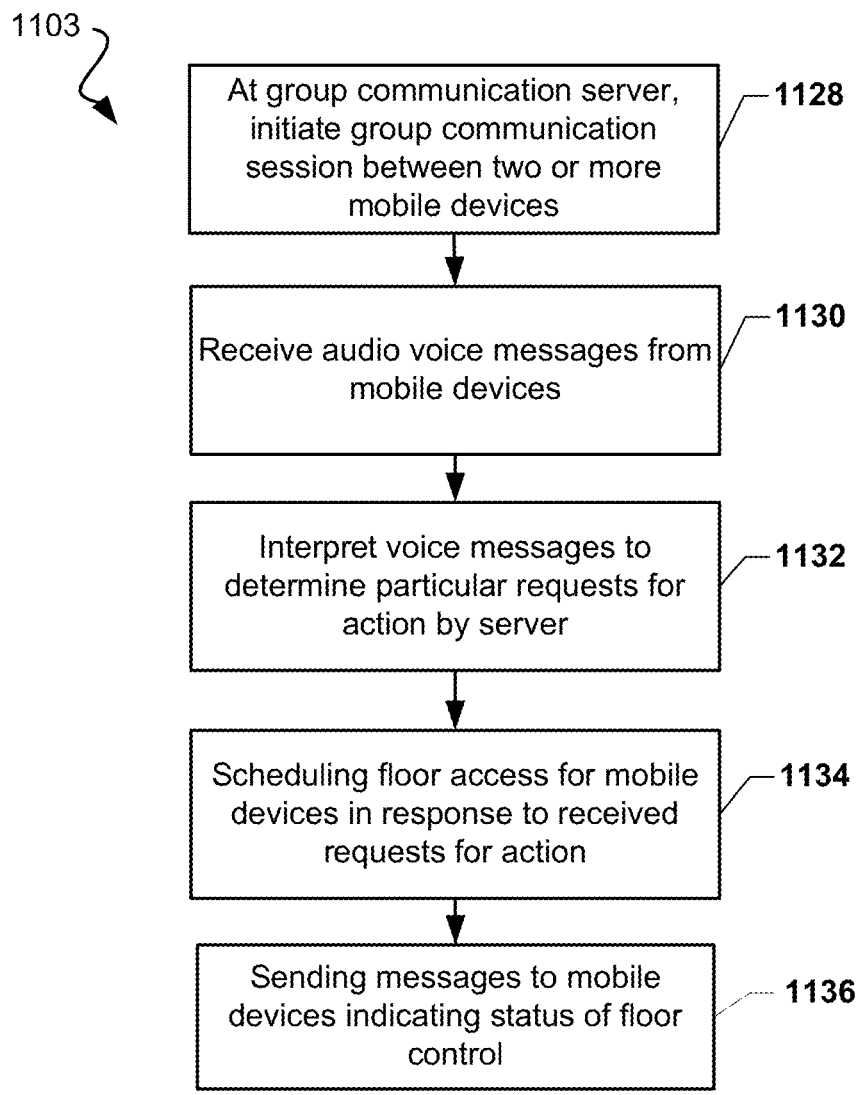
FIG. 11C is a process flow diagram illustrating an embodiment method of controlling floor access for a plurality of mobile devices by a server.

FIG. 11C is a process flow diagram illustrating an embodiment method 1103 of controlling floor access for a plurality of mobile devices by a server. In this embodiment method 1103, the server, which may be a group communication server 120 shown in FIG. 1, may receive audio voice messages from the mobile devices and analyze the messages to detect requests for action (i.e., voice commands) from the users of the mobile devices. The server may then process the requests as appropriate. In one aspect, the requests may include requests for floor access by the various mobile devices in a group communication session. The server may process the requests by scheduling floor access (e.g., "queuing" up the requesting devices for available floor times) during the group communication session. The server may send messages to the mobile devices indicating the status of the floor control for the session. The messages may be sent when the floor is granted to the particular requesting device and/or may be sent to indicate when the device is next scheduled for floor access.

In block 1128 of embodiment method 1103, the server 120 may initiate a group communication session between two or more mobile devices. The group communication session may be initiated and operated similar to any conventional half-duplex group communication session, such as a conventional Push-to-Talk session. The server 120 may receive audio voice messages from the mobile devices in the group communication session in block 1130. The audio voice messages may include voice commands from users of the mobile devices. In block 1132, the server 120 may interpret the voice messages to determine the particular requests for action by the server in the respective voice messages. The requests for action may include requests for access to the floor in the group communication session, for example. The server 120 may schedule floor access for the requesting mobile devices in response to the received requests for action in block 1134. In block 1136, the server 120 may send messages to the mobile devices indicating the status of floor control. The messages may inform the respective devices that, for example, the floor request is granted, the floor request is not granted, or that the device is scheduled for floor access at a later time.

Figure 12:
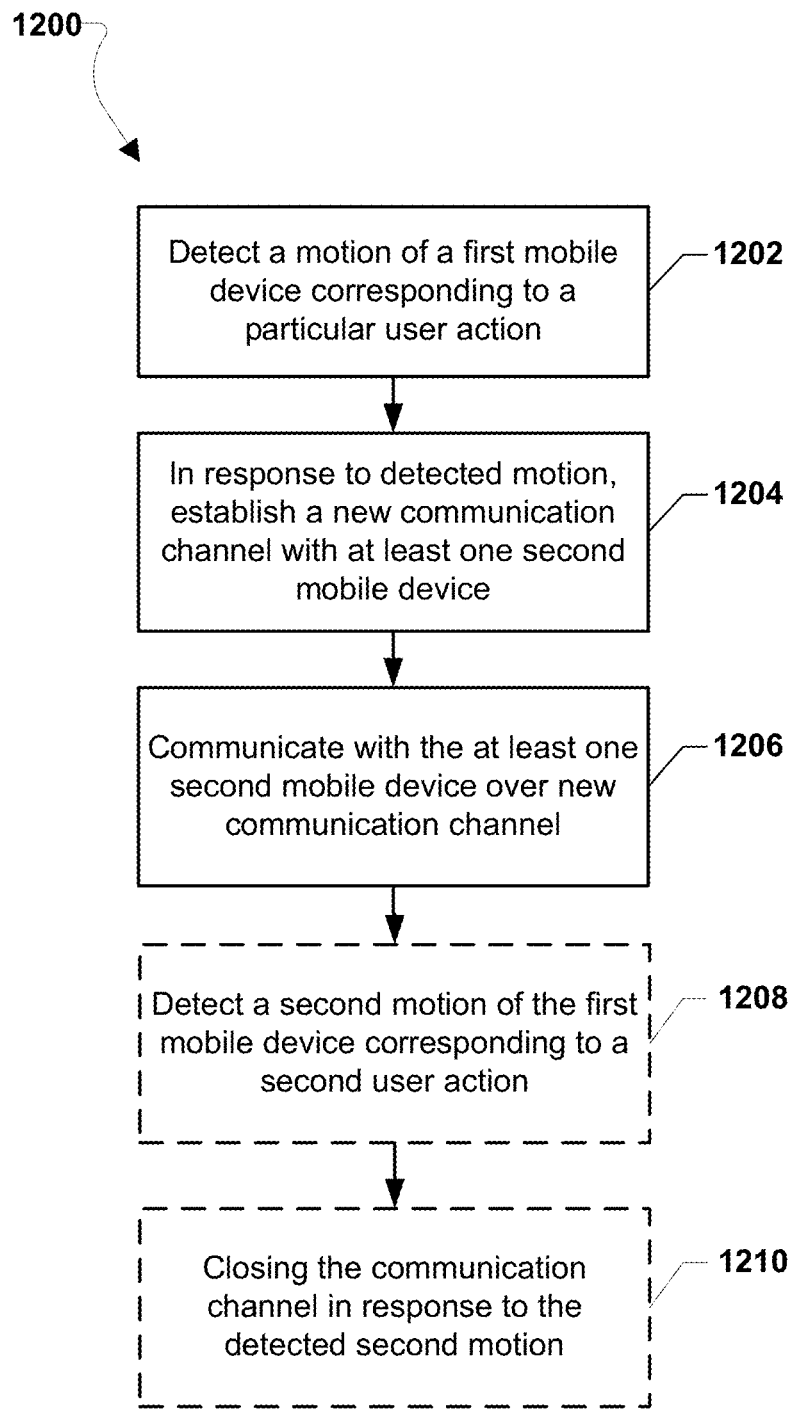
FIG. 12 is a process flow diagram illustrating an embodiment method for establishing a new communication channel with at least one second mobile device in response to a detected motion of a first mobile device.

Various embodiments include methods and systems of communicating using a first mobile device that include establishing a new communication channel with at least one other (i.e., second) mobile device in response to a detected motion of the first device. FIG. 12 illustrates an embodiment method 1200 for establishing a new communication channel with at least one second mobile device in response to a detected motion of a first mobile device. In block 1202 of embodiment method 1200, a first mobile device 102, may detect a motion of the device corresponding to a particular user action. The detected motion may be any movement or change in position or orientation of the device that may be correlated to a particular action by the user. For example, the detected motion may be any of the motions schematically illustrated in FIG. 2, such as the motion of the user bringing the device towards or away from his/her ear. The detected motion may also be a "flicking" motion, a shaking motion, etc. In some embodiments, the detected motion may be the rotation of the device handset, such as the user rotating the handset by 90°, by 180°, or by any arbitrary amount.

The mobile device 102 may be configured with accelerometers and gyroscopes, as are common in many smartphones, and the processor may be configured to monitor such sensors in block 1202 to determine when such sensor outputs match thresholds and/or patterns in memory correlated to particular actions. In an embodiment, mobile device motion measurements correlated to particular user actions may be defined by the user, such as via a menu interface and/or a training routine. Thus, operations that are encompassed in block 1202 (as well as blocks 1302, 1402, 1502, 1602 and 1610 discussed below) may include continuously monitoring accelerometer, gyroscope and/or other motion sensors when in an active state, and comparing sensor data received from such sensors within a sampling interval to patterns of motion sensor data stored in memory correlated to particular actions or commands. When a match is detected, the mobile device processor may initiate the action correlated to the matched pattern. In the various embodiments, that action may include establishing a new communication link and proceeding as described below.

In response to detecting a motion correlated to ensuring continuity of communications, the first mobile device may establish a new communication channel with at least one other (i.e., second) device, such as device(s) 104, 106, 108 in FIG. 1, in block 1204. In some embodiments, the first device 102 may have already established an initial communication channel, either a synchronous or asynchronous communication channel, with the at least one second mobile device, and in response to the detected motion, the first mobile device may establish a new communication channel with the second device. For example, the first mobile device 102 may be communicating with the at least one second mobile device using asynchronous messaging (e.g., SMS or e-mail), and in response to the detected motion may establish a synchronous communication channel with the at least one second mobile device. In other embodiments, the devices may be communicating over one type of synchronous communication channel (e.g., a half-duplex voice channel) and in response to the detected motion, the first mobile device may establish a different synchronous communication channel (e.g., a full-duplex voice channel or video channel). In other embodiments, the devices may initially not be communicating at all, and the first mobile device may establish a communication channel (e.g., initiate a phone/video call) with the at least one second mobile device in response to the detected motion. In another embodiment, the first mobile device may be participating in a half-duplex or Push-to-talk group communication session with the at least one second mobile device, and in response to the detected motion the first mobile device may establish a new communication channel by requesting the "floor" from a central server. In block 1206, the first mobile device 102 may communicate with the at least one second mobile device over the new communication channel.

In optional block 1208, the first mobile device may detect a second motion of the mobile device correlated to terminating a redundant channel or otherwise exiting a communication mode, and in response to the detected second motion may close the new communication channel with the at least one second mobile device in optional block 1210. For example, the first detected motion may be the motion of the user bringing the device to his/her ear and the detected second motion may be the motion of the user moving the device away from his/her ear. Alternatively, the first detected motion may be the motion of the user moving the device away from his/her ear, and the detected second motion may be the motion of the user moving the device towards his/her ear. The detected second motion may be any movement or change in position or orientation of the device that may be performed by the user, such as placing the mobile device on a surface, removing the device from a surface, a "flicking" motion, a shaking motion, a rotational motion of the device, etc.

In various embodiments, closing the new communication channel in optional block 1210 may terminate the communication session with the at least one second mobile device. In other embodiments, when the new communication channel is closed in optional block 1210, the first device may continue the communication session with the at least one second mobile device by transitioning to a different communication channel, which may be a previous communication channel used by the first mobile device for communicating with the at least one second mobile device.

Figure 13:
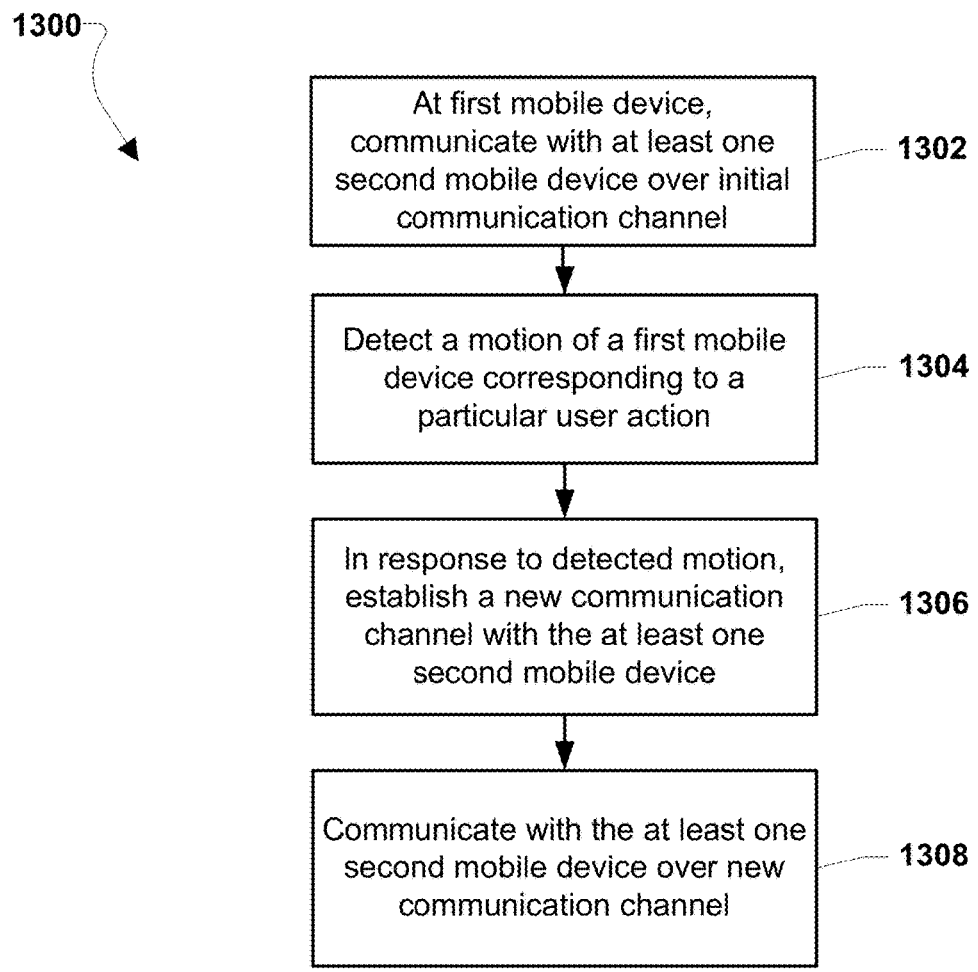
FIG. 13 is a process flow diagram illustrating a further embodiment method for establishing a new communication channel with at least one second mobile device based on a detected motion of a first mobile device.

FIG. 13 illustrates a further embodiment method 1300 for establishing a new communication channel with at least one other (i.e., second) mobile device in response to recognizing a particular motion of a first mobile device. In block 1302, a first mobile device 102 may communicate with at least one second mobile device, such as device(s) 104, 106, 108 in FIG. 1, over an initial communication channel. The initial communication channel may be an asynchronous communication channel (e.g., SMS or e-mail) or a synchronous communication channel (e.g., a half-duplex or full-duplex voice channel, a video channel, etc.). In block 1304, the first mobile device may detect a motion of the device corresponding to a particular user action. The detected motion may be any movement or change in position or orientation of the device that may be correlated to a particular action by the user, such as any of the motions schematically illustrated in FIG. 2 (e.g., moving the device to or from the user's ear, placing the mobile device on a surface), a "flicking" motion, a shaking motion, a rotation of the device handset, etc.

In response to the detected motion, the first mobile device may establish a new communication channel with the at least one second mobile device in block 1306. The new communication channel may be a different communication channel than the initial communication channel. For example, the initial communication channel may be an asynchronous communication channel and the new communication channel may be a synchronous communication channel. For example, the first mobile device may be communicating with at least one second mobile device asynchronously (such as via SMS or "texting"), and in response to the detected motion, which may be a movement of the device to the user's ear, for instance, the first device may establish a new synchronous communication channel with the at least one second mobile device. The new synchronous communication channel may be a half-duplex or full-duplex voice channel or a video channel, for example. In other embodiments, the initial communication channel may be a first synchronous communication channel, and the new communication channel may be a different synchronous communication channel. For example, the detected motion of the device may cause the device to transition between half-duplex and full-duplex communication channels, such as described above in connection with FIGS. 6A and 6B. In other embodiments, a detected motion of the mobile device, such as shaking or "flicking" the device, rotating the device handset by 90°, 180°, or by any arbitrary amount, etc., may cause the device to transition between a synchronous voice communication channel (e.g., half- or full-duplex) and a synchronous multimedia communication channel (e.g., video telephony), and vice versa. In block 1308, the first device may communicate with the at least one second mobile device over the new communication channel.

Figure 14:
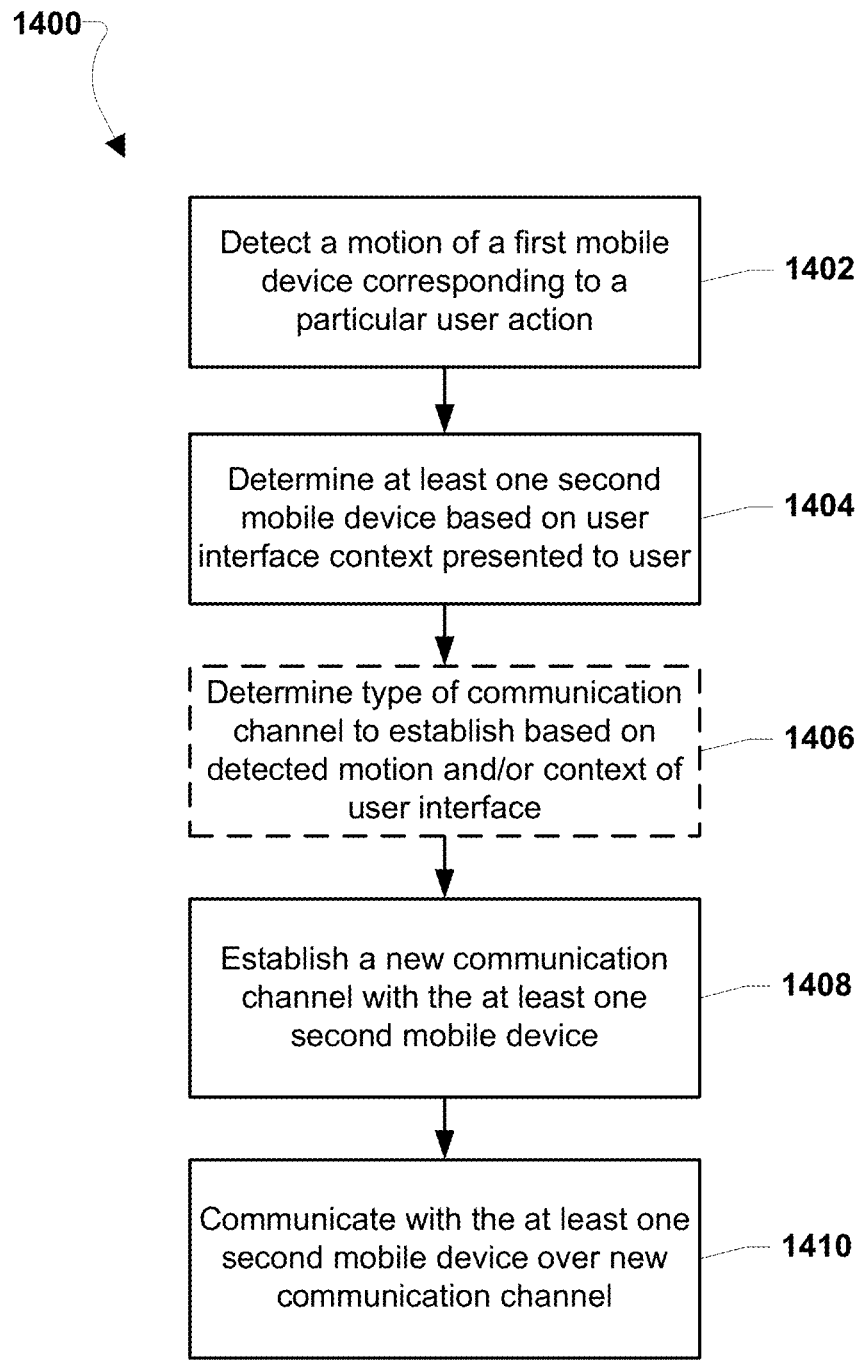
FIG. 14 is a process flow diagram illustrating a further embodiment method for establishing a new communication channel with at least one second mobile device based on a detected motion of a first mobile device.

FIG. 14 illustrates a further embodiment method 1400 for establishing a new communication channel with at least one other (i.e., second) mobile device based on a detected motion of a first mobile device. In block 1402 of embodiment method 1400, a first mobile device 102 may detect a motion of the device corresponding to a particular user action. The detected motion may be any movement or change in position or orientation of the device that may be correlated to a particular action by the user. For example, the detected motion may be any of the motions schematically illustrated in FIG. 2, such as the motion of the user bringing the device towards or away from his/her ear. The detected motion may also be a "flicking" motion, a shaking motion, etc. In some embodiments, the detected motion is the rotation of the device handset, such as the user rotating the handset by 90°, by 180°, or by any arbitrary amount.

In block 1404, the first mobile device may determine at least one second mobile device based on the user interface context presented to the user of the first mobile device. The user interface may be a display screen, such as a touchscreen interface, which may display text and/or graphical elements to the user. In embodiments, a unique identifier (e.g., phone number, URL, etc.) associated with the at least one second mobile device, and useable for establishing a communication channel with the at least one second mobile device, may be stored on the first mobile device (e.g., in a stored contact list). The first mobile device may determine the at least one second mobile device by associating one or more textual/graphical elements displayed on the user interface with a particular device or devices stored in the first mobile device's stored contacts. In some embodiments, the first mobile device may determine the at least one second mobile device based on a unique identifier (e.g., phone number, URL, etc.) for the device being displayed on the user interface (e.g., on a web page, e-mail, vCard, etc.), whether or not the device associated with the identifier is already stored in the first device's contact list.

There are various ways in which the first mobile device may extrapolate the identity of one or more second mobile devices with which the user intends to connect to from the user interface context presented to the user. In various embodiments, the first mobile device may identify at least one second mobile device when, for example, one or more contacts associated with another mobile device is highlighted or selected on the user interface. In embodiments, the first mobile device may identify at least one second mobile device when a conversation window is displayed that implies that the user is in conversation with one contact or with more than one contact (i.e., a group of contacts). In embodiments, the conversation window may be a means to identify at least one other device based on a conversation window being displayed on the screen, where the conversation window may be a scrollable region of the display that contains an ongoing conversation with another user. If the user of the first mobile device 102 has a conversation window on screen when the motion is detected (block 1402), then the first device may infer that a new communication channel should be initiated with at least one second mobile device associated with the user or users represented in the conversation window. In embodiments, the first mobile device may identify at least one second mobile device when a photograph of a contact (e.g., a user of a stored contact device) is displayed and/or when a video of a contact is displayed. The first mobile device may identify particular individuals depicted in a multimedia file (e.g., a photo or video) through metadata, such as "tagging" data, associated with the file and/or via facial or voice recognition software. In embodiments, the first mobile device may identify at least one second mobile device when a calendar event is displayed that is common with one or more contacts. In embodiments, the first mobile device may identify at least one second mobile device when a particular location, such as a map location, is displayed, where the at least one second mobile device is known to be at the particular location.

The first mobile device may establish a new communication channel with the at least one second mobile device in block 1408. The new communication channel may be an asynchronous communication channel or a synchronous communication channel, such as a half-duplex or full-duplex voice channel, a video channel, a streaming touchpoints channel, etc. As used herein, "touchpoints" is a feature name for the ability for a user to press or touch on certain regions of media content (e.g., picture, video, etc.) displayed on his/her screen on a first device, while in a synchronous session with another user that has the same media content displayed on his/her screen on a second device, where the region that is touched on the first device may be animated or otherwise indicated on the second device. For example, if the first user touches the upper left hand portion of a picture, the second user may see an animation or other indication in the upper left hand portion of the same picture on his/her device.

In some embodiments, before establishing the new communication channel, the first mobile device may determine the type of the new communication channel to establish based on the detected motion, the user interface context, or both, in optional block 1406. For example, if the detected motion corresponds to the user bringing the device handset to his/her ear, then the new communication channel may be a voice channel, such as a full-duplex voice channel. On the other hand, if the detected motion corresponds to the user bringing the handset in front of his/her face, then the new communication channel may be a half-duplex (e.g., Push-to-Talk) voice channel or a video channel. In addition, the first mobile device may determine the type of communication channel to establish based on the user interface context being presented to the user. For example, if the user interface displays a call history screen with a particular contact highlighted, then the first mobile device may infer that the new communication channel should be a voice call. If the user interface displays a video clip in which a particular contact is present, then the first mobile device may infer that the new communication channel should be a video call. If the user interface displays a photo of the contact, then the first mobile device may infer that the new communication channel should be a "touchpoints call," and so forth. As discussed above, a "touchpoints" call may include a conversation or session through which two or more users may share media content, such as a picture, video, slide presentation, etc., and which a user may visually indicate portions or features of the content on another user's device.

In embodiments, the type of new communication channel to establish may also be determined based on prior communication sessions with the at least one second communication device. For example, if the last communication session with a particular contact was a video chat, then the first mobile device may infer that the new communication channel with the same contact should be a video channel.

Figure 15:
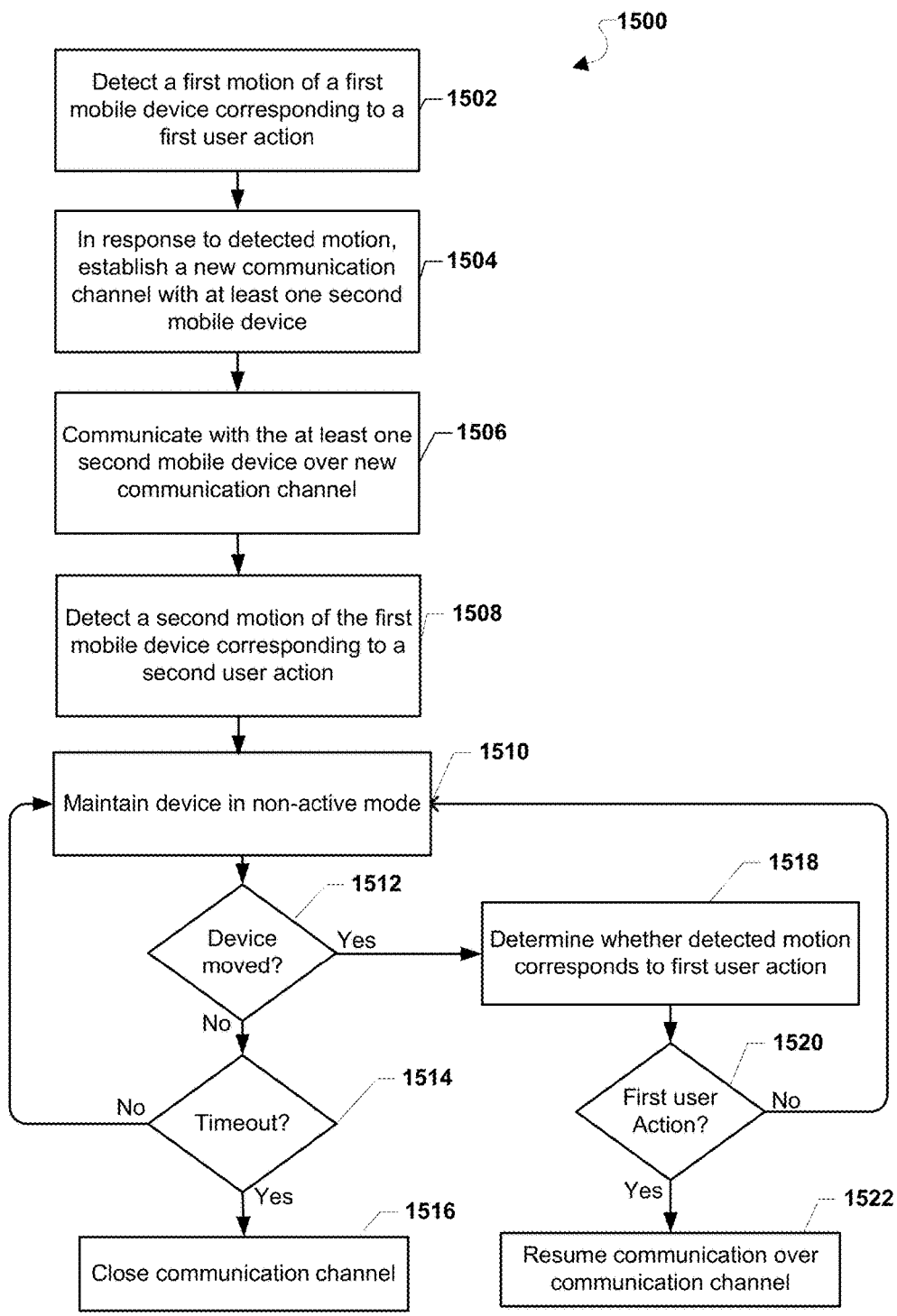
FIG. 15 is a process flow diagram illustrating a method for group communication with a mobile device in which a communication session may be paused or suspended based on a detected motion of the mobile device.

FIG. 15 illustrates an embodiment method 1500 for group communication with a mobile device in which a communication session may be paused or suspended based on a detected motion of the mobile device. Operations performed in blocks 1502-1506 of embodiment method 1500 may be similar to the operations in blocks 1202-1206 of embodiment method 1200 described above with reference to FIG. 12. These operations may include detecting a first motion of the first mobile device correlated to a first user action (block 1502), in response to the detected motion, establishing a new communication channel with at least one second mobile device (block 1504), and communicating with the at least one second mobile device over the new communication channel (block 1506). In block 1508, the first mobile device may detect a second motion of the device correlated to a second user action. The detected second motion may be any movement or change in position or orientation of the device that may be correlated to a particular action by the user, such as the user pulling the device away from his/her ear, placing the mobile device face-up or face-down on a surface, "flicking," shaking or rotating the device, etc. Upon detecting the second motion, the first mobile device may be maintained in a non-active communication mode in block 1510. Upon entering the non-active communication mode, the device may silence the speaker, mute the microphone and/or otherwise suppress incoming and/or outgoing communications with the at least one second mobile device. Suppressing communication at the mobile device may involve suspending forced audio messages from the at least one second mobile device.

The mobile device may remain in a non-active communication mode for a pre-determined timeout period (i.e., while determination block 1514="No"). The timeout period may be variable, and in some embodiments may be programmable by the user. In general, the timeout period in embodiment method 1500 may be relatively short (e.g., 1 minute or less, such as 5-30 seconds, optionally less than 5 seconds, such as 1-2 seconds or less), since the detected second motion may indicate that the user does not wish to continue the communication session. However, the user may have inadvertently or temporarily moved the device, with the intent to resume or continue the communication session, so the timeout period may provide the user an opportunity to exit the non-active communication mode and resume the communication session. As shown in FIG. 15, for example, while the mobile device is in a non-active communication mode, a processor of the device may determine whether the device has been moved. If the mobile device has been moved (i.e., determination block 1512="Yes"), the device processor may determine whether the detected motion corresponds to the first user action in block 1518. For example, the detected motion may correspond to the user moving the device towards his or her ear, indicating an intent to continue the communication. If the detected motion is correlated to the first user action (i.e., determination block 1520="Yes"), the mobile device may resume the communication over the communication channel in block 1522. If the detected motion is not correlated to the first user action (i.e., determination block 1520="No"), then the device may be maintained in the non-active communication mode in block 1510. If the device is not moved (i.e., determination block 1512="No") and the timeout period expires (i.e., determination block 1514="Yes"), then the communication channel may be closed in block 1516.

Various embodiments include methods and system for initiating and/or controlling a half-duplex communication session based on the detected motion of the mobile device handset. In such embodiments, a first mobile device may detect a first motion and in response to the detected motion, the device may initiate or launch a half-duplex group communication application, such as a Push-to-Talk (PTT) application. For example, the user may be conducting asynchronous messaging with at least one second mobile device and by rotating the handset by a pre-determined amount (e.g., 180°), the device may automatically initiate a half-duplex group communication session. The detected first motion may trigger a change in the user interface context (i.e., the device may display icons or other visual feedback associated with half-duplex communication, such as a "virtual" PTT button), and in some embodiments, may automatically request the "floor" for group communication with at least one second mobile device.

Figure 16A:
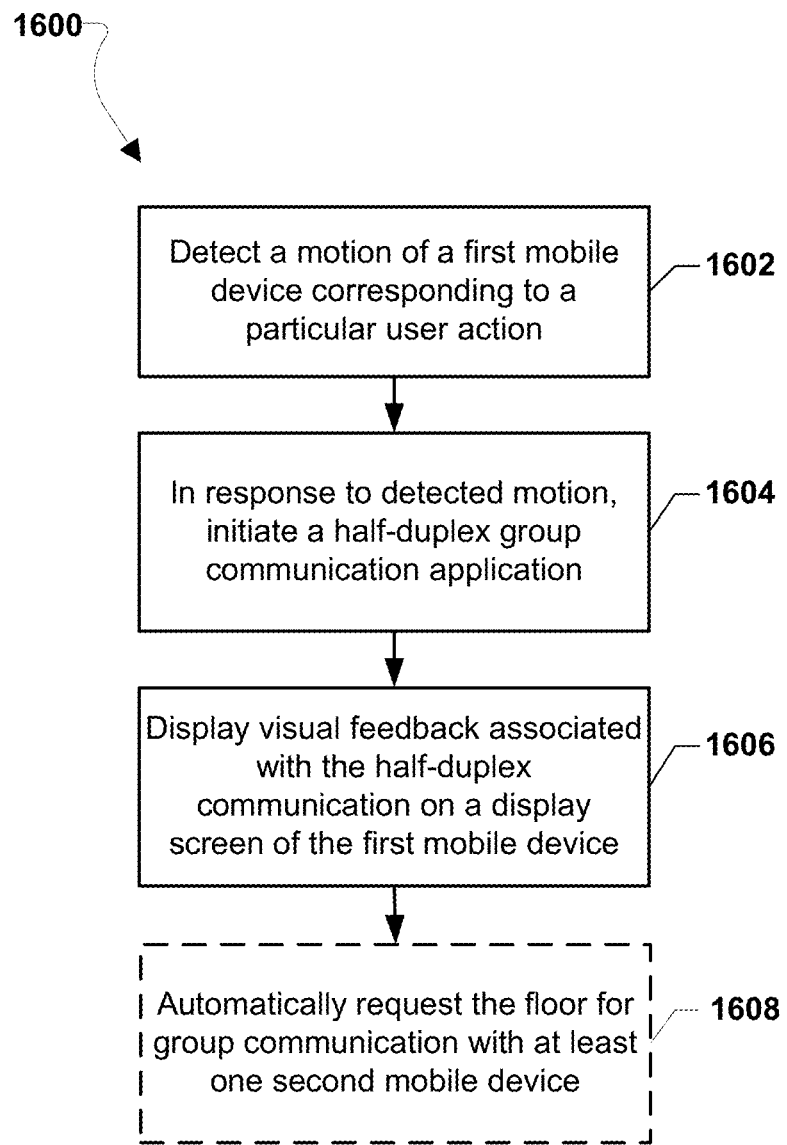
FIG. 16A is a process flow diagram illustrating an embodiment method for initiating a half-duplex communication session based on the detected motion of a mobile device.

FIG. 16A illustrates an embodiment method 1600 for initiating a half-duplex communication session based on the detected motion of a mobile device. In block 1602, a first mobile device 102 may detect a motion of the device corresponding to a particular user action. As discussed above, the detected motion may be any movement or change in position or orientation of the device that may be correlated to a particular action by the user. For example, the detected motion may be any of the motions schematically illustrated in FIG. 2, such as the motion of the user bringing the device towards or away from his/her ear. The detected motion may also be a "flicking" motion, a shaking motion, etc. In some embodiments, the detected motion may be the rotation of the device handset, such as the user rotating the handset by 90°, by 180°, or by any arbitrary amount.

In response to the detected motion, the first mobile device 102 may initiate a half-duplex group communication application (e.g., a PTT application) in block 1604. The device may display visual feedback associated with the half-duplex communication on a display screen of the mobile device in block 1606. In an embodiment, the detected motion of the device handset may cause a change in a user interface context, such that the device may display icons or other visual feedback associated with half-duplex communication, such as a "virtual" PTT button. The device 102 may display contact information, such as name(s), icon(s), photograph(s), etc., associated with at least one other (i.e., second) mobile device that forms a communication group (e.g., PTT group) with the first mobile device 102. In some instances, the first mobile device may be communicating with at least one other mobile device over an initial communication channel, such as an asynchronous channel, and based on the detected motion of the device, the first mobile device may initiate a half-duplex communication session with the at least one second mobile device. The of the user interface context may change to indicate that the first mobile communication device is now in a half-duplex group communication session with the at least one second mobile device.

In some embodiments, in response to the detected motion, the first mobile device may initiate a half-duplex communication session with the last communication group with which the first mobile device was previously engaged in a half-duplex communication session. The of the user interface context may change to indicate that the first mobile device is now in a group communication session with this communication group.

In some embodiments, in response to the detected motion, the first mobile device may initiate a half-duplex communication session with at least one other mobile device based on the of the user interface context at the time the half-duplex communication session is initiated. For example, the user may scroll through, highlight or otherwise display one or more contacts on the user interface, and based on the detected movement of the first device, a group communication session may be initiated with the mobile device(s) associated with these contact(s). In some embodiments, the user interface may display a photograph, video or other media file containing one or more contacts, or a web-page or other graphical/textual elements associated with one or more contacts, and based on the detected movement of the first device, a group communication session may be initiated with the mobile device(s) associated with these contact(s). The of the user interface context may change to indicate that the first mobile device is now in a group communication session with the mobile device(s) associated with these contact(s).

In some embodiments, the detected first motion may cause the first mobile device 102 to automatically request the "floor" for communication with the at least one second mobile device, as shown in optional block 1608.

Figure 16B:
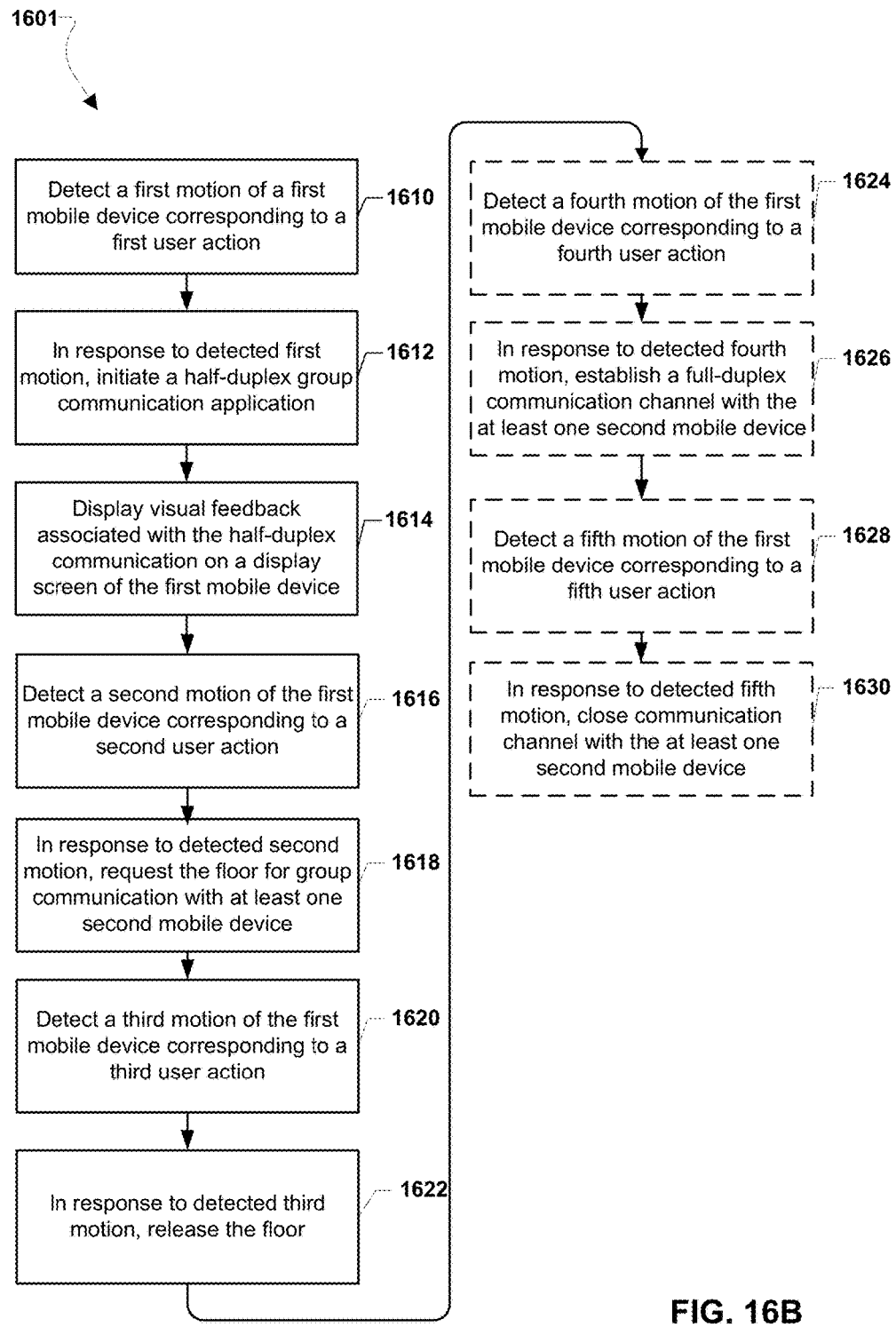
FIG. 16B is a process flow diagram illustrating an embodiment method for initiating and controlling a half-duplex communication session based on the detected motion of a mobile device.

FIG. 16B illustrates an embodiment method 1601 for initiating and controlling a half-duplex communication session based on the detected motion of a mobile device. Blocks 1610-1614 of embodiment method 1601 are similar to blocks 1602-1606 of embodiment method 1600 shown in FIG. 16A, and may include detecting a first motion of a first mobile device corresponding to a first user action (block 1610), in response to the detected first motion, initiating a half-duplex group communication application (block 1612), and displaying visual feedback associated with the half-duplex communication on a display screen of the first mobile device (block 1614). In block 1616, the first mobile device may detect a second motion of the first mobile device. In response to the detected second motion, the first mobile device may request the floor for group communication with at least one other device. For example, the first detected motion may be a rotation of the device handset, such as by 90°, 180°, or by any arbitrary amount, which may initiate the half-duplex group communication application. A further detected rotation of the device handset, such as by 90°, 180°, or by any arbitrary amount, may trigger the device to request the floor for half-duplex communication.

In block 1620, the first mobile device may detect a third motion of the mobile device. In response to the detected third motion, the first mobile device may release control of the floor in the group communication session in block 1622. For example, the detected second motion may be a rotation of the handset, which causes the device to request the floor, and a detected third motion, such as a rotation of the handset back to its previous orientation, may trigger a release of the floor.

In optional bock 1624, the first mobile device may detect a fourth motion of the mobile device. In response to the detected fourth motion, the device may establish a full-duplex communication channel with the at least one second mobile device in optional block 1626. For example, the detected fourth motion may be a motion corresponding to the user bringing the device to his/her ear, which may trigger a transition from a half-duplex communication to a full-duplex communication.

In optional block 1628, the first mobile device may detect a fifth motion of the device. In response to the detected fifth motion, the device may close the communication channel with the at least one second mobile device. For example, the fifth motion may correspond to the user placing the mobile device face-up or face-down on a surface, or any motion that may indicate that the user intends to end the communication session.

Figure 17:
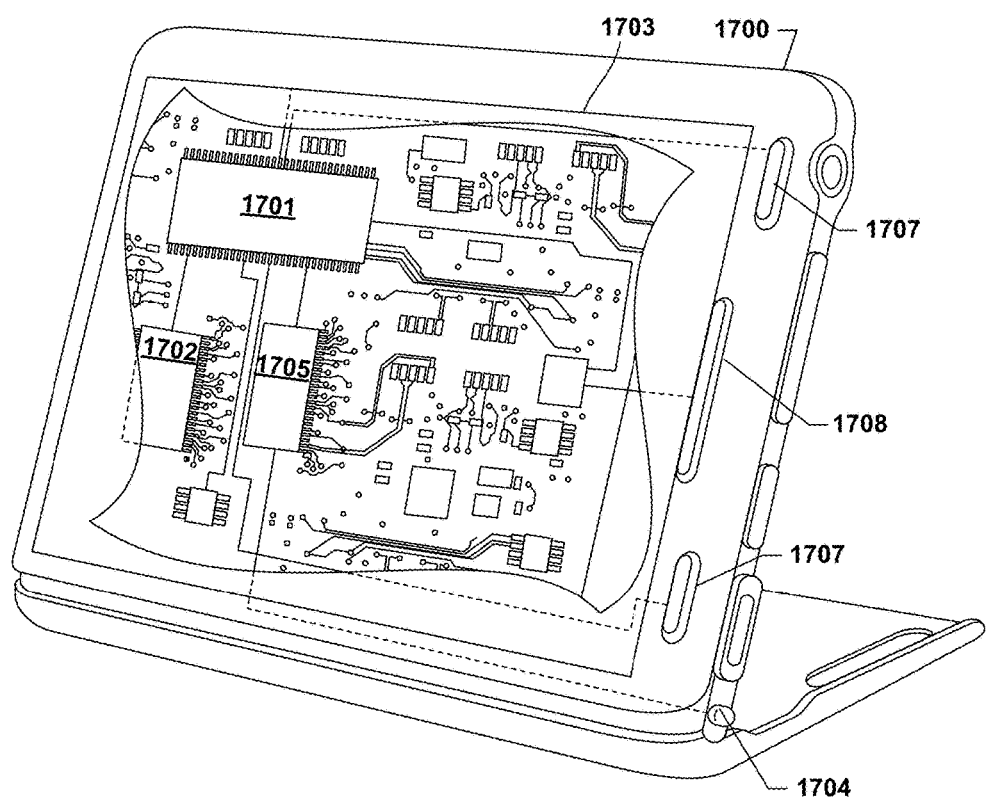
FIG. 17 is a system block diagram of a wireless communication device for use with various embodiments.

FIG. 17 is a system block diagram of a mobile device suitable for use with any of the embodiments. A typical mobile device 1700 may include a processor 1701 coupled to internal memory 1702, to a display 1703, and to a speaker 1708. Additionally, the receiver device 1700 may include an antenna 1704 for sending and receiving electromagnetic radiation that may be connected to a wireless data link and/or cellular telephone transceiver 1705 coupled to the processor 1701. Mobile devices 1700 typically also include menu selection buttons 1707 or rocker switches for receiving user inputs.

Figure 18:
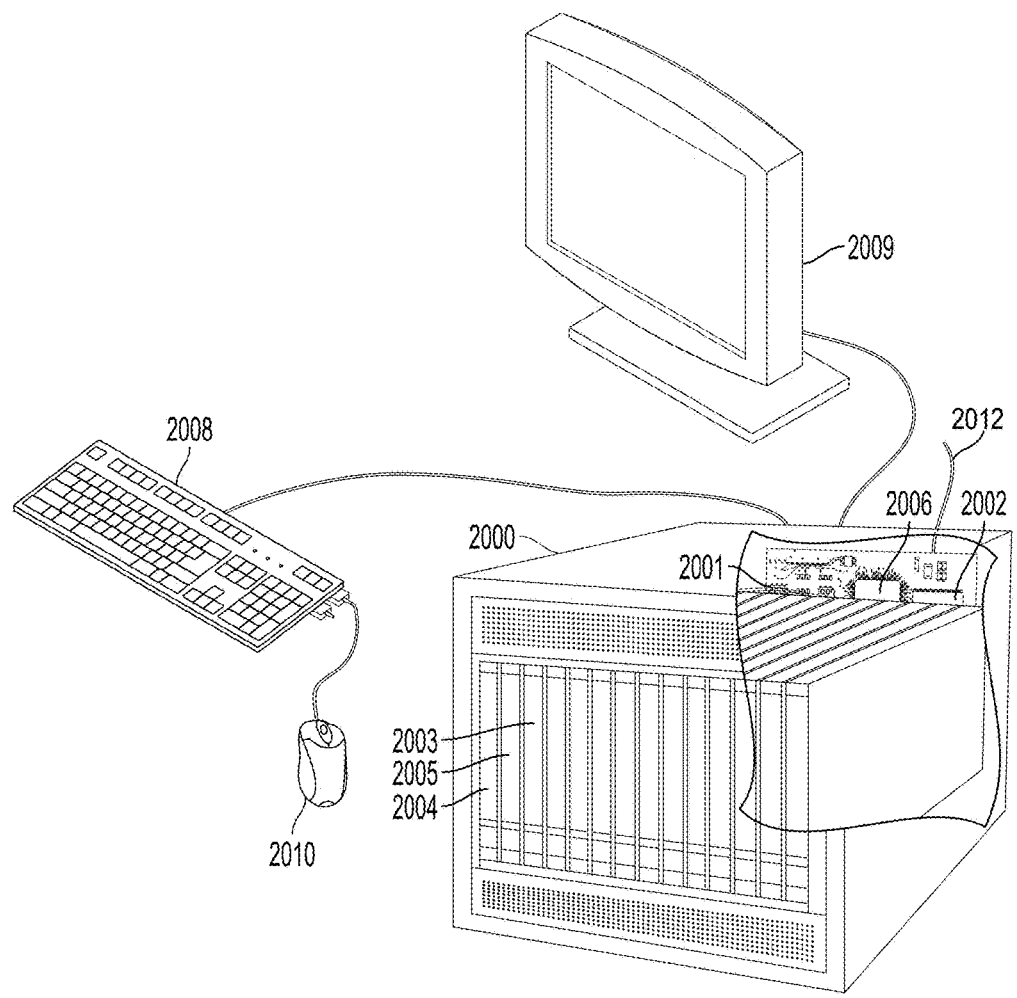
FIG. 18 is a system block diagram of a server suitable for use with various embodiments.

The various embodiments may be implemented on the data transmission side on any of a variety of commercially available server devices, such as the server 2000 illustrated in FIG. 18. Such a server 2000 typically includes a processor 2001 coupled to volatile memory 2002 and a large capacity nonvolatile memory, such as a disk drive 2003. The server 2000 may also include a floppy disc drive, compact disc (CD) or DVD disc drive 2004 coupled to the processor 2001. The server 2000 may also include network access ports 2006 coupled to the processor 2001 for establishing data connections with a network 2012, such as a local area network coupled to other broadcast system computers and servers. Servers 2000 may also include operator interfaces, such as a keyboard 2008, pointer device (e.g., a computer mouse 2010), and a display 2009.

The processors 1701, 2001 may be any programmable microprocessor, microcomputer or multiple processor chip or chips that can be configured by software instructions (applications) to perform a variety of functions, including the functions of the various embodiments described below. In some mobile receiver devices, multiple processors 2001 may be provided, such as one processor dedicated to wireless communication functions and one processor dedicated to running other applications. Typically, software applications may be stored in the internal memory 1702, 2002, 2003 before they are accessed and loaded into the processor 1701, 2001. The processor 1701, 2001 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any media that may be accessed by a computer or a processor. By way of example, and not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

what is claimed is:

1. A method of group communication using a first mobile device, comprising:
   establishing a communication session with at least one second mobile device;
   detecting a motion of the first mobile device corresponding to a user placing the first mobile device facedown on a surface;
   entering a non-active communication mode in response to the detected motion, wherein:
      the non-active communication mode comprises suppressing at least one communication from the at least one second mobile device received at the first mobile device; and
      the at least one communication is recorded for later playback while the first mobile device is in the non-active communication mode;
   sending, by the first mobile device, a message to the at least one second mobile device, the message indicating:
      that the first mobile device has entered a non-active communication mode; and
      that the communication session will end;
   maintaining the first mobile device in a non-active communication mode for a pre-determined timeout period;
   ending the communication session upon expiration of the pre-determined timeout period;
   detecting a movement of the first mobile device during the pre-determined timeout period; and
   resuming the communication session in an active mode in response to the detected movement.

2. A mobile communication device, comprising:
   a transceiver; and
   a processor coupled to the transceiver and configured with processor-executable instructions to perform operations comprising:
      establishing a communication session with at least one second mobile device;
      detecting a motion of the mobile communication device corresponding to a user placing the mobile communication device facedown on a surface;
      entering a non-active communication mode in response to the detected motion, wherein:
         the non-active communication mode comprises suppressing at least one communication from the at least one second mobile device received at the mobile communication device; and
         the at least one communication is recorded for later playback while the mobile communication device is in the non-active communication mode;
      sending a message from the mobile communication device to the at least one second mobile device, the message indicating:
         that the mobile communication device has entered a non-active communication mode; and
         that the communication session will end;
      maintaining the mobile communication device in a non-active communication mode for a pre-determined timeout period;
      ending the communication session upon expiration of the pre-determined timeout period;
      detecting a movement of the mobile communication device during the pre-determined timeout period; and
      resuming the communication session in an active mode in response to the detected movement.

3. A mobile communication device, comprising:
   means for establishing a communication session with at least one second mobile device;
   means for detecting a motion of the mobile communication device corresponding to a user placing the mobile communication device facedown on a surface;
   means for entering a non-active communication mode in response to the detected motion, wherein:
      means for entering a non-active communication mode comprises means for suppressing at least one communication from the at least one second mobile device received at the mobile communication device; and
      the at least one communication is recorded for later playback while the mobile communication device is in the non-active communication mode;
   means for sending a message from the mobile communication device to the at least one second mobile device, the message indicating:
      that the mobile communication device has entered a non-active communication mode; and
      that the communication session will end;
   means for maintaining the mobile communication device in a non-active communication mode for a pre-determined timeout period;
   means for ending the communication session upon expiration of the pre-determined timeout period;
   means for detecting a movement of the mobile communication device during the pre-determined timeout period; and
   means for resuming the communication session in an active mode in response to the detected movement.

4. A non-transitory computer-readable storage medium having stored thereon processor executable instructions configured to cause a processor of a first mobile communication device to perform operations comprising:
- establishing a communication session with at least one second mobile device;
- detecting a motion of the first mobile communication device corresponding to a user placing the first mobile communication device facedown on a surface;
- entering a non-active communication mode in response to the detected motion, wherein:
  - the non-active communication mode comprises suppressing at least one communication from the at least one second mobile device received at the first mobile communication device; and
  - the at least one communication is recorded for later playback while the first mobile communication device is in the non-active communication mode;
- sending a message from the first mobile communication device to the at least one second mobile device, the message indicating:
  - that the first mobile communication device has entered a non-active communication mode; and
  - that the communication session will end;
- maintaining the first mobile communication device in a non-active communication mode for a pre-determined timeout period;
- ending the communication session upon expiration of the pre-determined timeout period;
- detecting a movement of the first mobile communication device during the pre-determined timeout period; and
- resuming the communication session in an active mode in response to the detected movement.

* * * * *